(12) United States Patent
de Oliveira et al.

(10) Patent No.: US 11,115,476 B1
(45) Date of Patent: Sep. 7, 2021

(54) SYSTEM FOR AND METHOD OF CONTROLLING OPERATIONS OF A CAR WASH

(71) Applicant: DRB Systems, LLC, Akron, OH (US)

(72) Inventors: Sergio de Oliveira, Massillon, OH (US); Andrew Clugston, Akron, OH (US)

(73) Assignee: DRB SYSTEMS, LLC, Akron, OH (US)

( * ) Notice: Subject to any disclaimer, the term of this patent is extended or adjusted under 35 U.S.C. 154(b) by 14 days.

(21) Appl. No.: 16/855,284

(22) Filed: Apr. 22, 2020

(51) Int. Cl.
| | |
|---|---|
| *G06F 3/0488* | (2013.01) |
| *H04L 29/08* | (2006.01) |
| *G06Q 20/20* | (2012.01) |
| *G06F 3/14* | (2006.01) |
| *G05B 15/02* | (2006.01) |
| *G06F 3/0482* | (2013.01) |

(52) U.S. Cl.
CPC .............. *H04L 67/12* (2013.01); *G05B 15/02* (2013.01); *G06F 3/0482* (2013.01); *G06F 3/0488* (2013.01); *G06F 3/1423* (2013.01); *G06Q 20/204* (2013.01)

(58) Field of Classification Search
CPC ........................................................ H04L 67/12
USPC ........................................................ 700/275
See application file for complete search history.

(56) References Cited

U.S. PATENT DOCUMENTS

| | | | | |
|---|---|---|---|---|
| 5,950,169 | A * | 9/1999 | Borghesi | G06Q 30/0283 705/4 |
| 6,122,633 | A * | 9/2000 | Leymann | G06Q 10/10 |
| 6,338,066 | B1 * | 1/2002 | Martin | G06Q 30/02 707/708 |
| 6,402,030 | B1 * | 6/2002 | Summers | G06Q 20/342 235/375 |
| 6,970,844 | B1 * | 11/2005 | Bierenbaum | G06Q 10/00 705/39 |
| 7,275,039 | B2 * | 9/2007 | Setteducati | G06Q 10/06314 705/7.24 |
| 7,631,291 | B2 * | 12/2009 | Shukla | G06F 8/10 717/107 |
| 7,747,958 | B2 * | 6/2010 | Luo | G06F 8/34 715/762 |
| 8,060,627 | B2 * | 11/2011 | Rosenblatt | G06F 9/54 709/228 |
| 8,656,352 | B2 * | 2/2014 | Szpak | G06Q 10/10 717/109 |
| 8,700,442 | B2 * | 4/2014 | Takaoka | H04N 1/00501 705/7.27 |
| 9,912,824 | B2 * | 3/2018 | St. Jacques, Jr. | H04N 1/00474 |

(Continued)

OTHER PUBLICATIONS

Unitec; Sierra Management System Programming Reference Manual; https://www.startwithunitec.com/sc-admin/uploads/ss1000-sierra-manage-app-programming-manual-1-74-2-XmTY.pdf; 2015; Submitted in Four Parts Due to File Size.

*Primary Examiner* — Reza Nabi
(74) *Attorney, Agent, or Firm* — Daniel J. Schlue; Schlue IP Law

(57) ABSTRACT

A method of and system for controlling operations of a car wash is disclosed herein, wherein a tertiary computing device of the system can be positioned at an upstream end of a tunnel of a car wash. A secondary server computing device of the system can also be positioned on-site with the car wash. A primary server computing device of the system can be positioned off-site of the car wash. The computing devices of the system can allow a consumer to select.

20 Claims, 20 Drawing Sheets

(56) References Cited

U.S. PATENT DOCUMENTS

| | | | |
|---|---|---|---|
| 9,996,209 B2* | 6/2018 | Grossman | G06Q 10/06 |
| 2002/0178126 A1* | 11/2002 | Beck | G16H 20/60 |
| | | | 705/75 |
| 2004/0079799 A1* | 4/2004 | Symonds | G06Q 30/06 |
| | | | 235/381 |
| 2004/0169673 A1* | 9/2004 | Crampe | A61B 34/20 |
| | | | 715/700 |
| 2004/0220817 A1* | 11/2004 | Sanville | G06Q 10/06 |
| | | | 700/265 |
| 2005/0086072 A1* | 4/2005 | Fox, Jr. | G16H 40/20 |
| | | | 705/2 |
| 2005/0144043 A1* | 6/2005 | Holland | G16H 40/67 |
| | | | 705/3 |
| 2005/0234569 A1* | 10/2005 | Byrer | G07F 9/002 |
| | | | 700/90 |
| 2006/0112050 A1* | 5/2006 | Miikkulainen | G16H 50/20 |
| | | | 706/46 |
| 2006/0144430 A1* | 7/2006 | Ringdahl | G07F 17/20 |
| | | | 134/123 |
| 2008/0083428 A1* | 4/2008 | Johnston | B60S 3/06 |
| | | | 134/4 |
| 2008/0229531 A1* | 9/2008 | Takida | B60S 3/06 |
| | | | 15/53.2 |
| 2008/0300724 A1* | 12/2008 | De Silvio | B60S 3/066 |
| | | | 700/275 |
| 2009/0178004 A1* | 7/2009 | Stoval, III | G16H 10/60 |
| | | | 715/812 |
| 2009/0250086 A1* | 10/2009 | Belanger | B60S 3/004 |
| | | | 134/57 R |
| 2009/0281862 A1* | 11/2009 | Conescu | G06F 3/1253 |
| | | | 705/7.27 |
| 2010/0185954 A1* | 7/2010 | Simernitski | G06Q 10/06 |
| | | | 715/751 |
| 2011/0114116 A1* | 5/2011 | Williams | B60S 3/047 |
| | | | 134/6 |
| 2011/0153343 A1 | 6/2011 | Tremblay et al. | |
| 2012/0060863 A1* | 3/2012 | Speckmaier | B60S 3/063 |
| | | | 134/6 |
| 2013/0199565 A1* | 8/2013 | Petit | B08B 3/024 |
| | | | 134/6 |
| 2013/0220369 A1* | 8/2013 | Wimmer | B60S 3/063 |
| | | | 134/6 |
| 2015/0245587 A1* | 9/2015 | Van Den Berg | A01K 1/015 |
| | | | 134/6 |
| 2016/0116303 A1* | 4/2016 | Rose | G06F 3/04817 |
| | | | 702/188 |
| 2016/0300047 A1* | 10/2016 | Tapscott | G07F 9/002 |
| 2017/0322560 A1* | 11/2017 | Zhang | G06K 9/00805 |
| 2018/0281752 A1* | 10/2018 | Detrick | B60S 3/04 |
| 2019/0050543 A1* | 2/2019 | Tapscott | G07F 9/002 |
| 2019/0256056 A1* | 8/2019 | Kim | B60S 3/04 |
| 2019/0263424 A1* | 8/2019 | Penilla | H04W 12/08 |
| 2019/0325543 A1 | 10/2019 | Tremblay et al. | |
| 2020/0005305 A1* | 1/2020 | Ravi | G06Q 20/3829 |
| 2020/0198620 A1* | 6/2020 | Nakata | H04W 4/024 |
| 2021/0044737 A1* | 2/2021 | Kang | H04N 21/25816 |
| 2021/0086348 A1* | 3/2021 | Mozhar | B25J 9/0051 |

* cited by examiner

SYSTEM FOR AND METHOD OF CONTROLLING OPERATIONS OF A CAR WASH

CROSS-REFERENCE TO RELATED APPLICATIONS

This application claims the benefit of priority to U.S. Provisional Patent Application Ser. No. 62/957,829 for System and Method of Controlling Operations of a Car-Wash, filed on Jan. 7, 2020; U.S. Provisional Patent Application Ser. No. 62/837,260 for Car-Wash Systems and Related Methods, filed on Apr. 23, 2019; and also to U.S. Provisional Patent Application Ser. No. 62/837,266 for Car-Wash Systems and Related Methods, filed on Apr. 23, 2019. All three applications are hereby incorporated by reference in their entireties.

BACKGROUND

1. Field

The present disclosure relates to controlling systems for cleaning, i.e., the separation or removal of adherent dirt and impurities or any other foreign or undesired matter (as distinguished from solid-material working to obtain desired shapes or new surfaces or removal of a constituent part of the base material of a solid) from vehicles, involving treating the vehicle with a mechanically acting solid agent in addition to the application of fluids, as, for example, use of brushing and wiping, such as found in United States Classification (USPC) class 134, subclass 006.

2. Description of Related Prior Art

U.S. Pub. No. 2019/0050543 discloses MANAGING AUTHORIZATION CODES FROM MULTIPLE SOURCES. The '543 publication describes apparatus, systems and methods in which a first data storage is maintained for a first group of authorization codes, for example those associated with a local POS system, and second data storage, logically separate from the first data storage, is maintained for a second group of authorization codes, such as those associated with a remote or online sales system. Access control is achieved by checking a received authorization code for validity against one or both groups of authorization codes, without needing to integrate different code assignment systems or different sales systems with one another. The technology has particular utility for automated car wash systems, although it is not limited thereto, and embodiments of the technology may be retrofit to existing car wash control interfaces.

U.S. Pub. No. 2018/0281752 discloses a METHOD AND SYSTEM FOR WASHING A VEHICLE. A wash equipment assembly for a car wash and method of operating the equipment are described. For example, the assembly includes a cleaning element configured to clean a vehicle, an arm assembly operably attached to the cleaning element and configured to move the cleaning element to a vehicle cleaning position, the arm movably fixed to a support at a first end and the cleaning element mounted on the arm at a second end, a controlled locator for positioning the arm relative to the support such that the cleaning equipment is moved to the vehicle cleaning position, and a sensor for evaluating an actual orientation of the cleaning element relative to a default orientation of the cleaning element. In certain implementations, the controlled locator can modify the position of the arm in response to a signal from the sensor, thereby providing a closed loop control system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of controlling operations of a car wash can include positioning at least one tertiary computing device having one or more processors and a touch screen display along a pathway extending through a tunnel of the car wash. The at least one tertiary computing device can be positioned closer to an upstream end of the tunnel than to a downstream end of the tunnel. The method can also include storing, in memory of at least one secondary server computing device having one or more processors, a workflow executed on the at least one tertiary computing device. The workflow can include data defining at least a first plurality of actions, a screen display associated with each of the first plurality of actions, a first plurality of graphical elements displayed in one or more of the screen displays associated with the first plurality of actions, and a first predetermined order of displaying the screen displays associated with the first plurality of actions. The method can also include fetching, from the at least one secondary server computing device, with the at least one tertiary computing device, the screen displays associated with the first plurality of actions. The method can also include positioning the at least one secondary server computing device on-site at the car wash with the at least one tertiary computing device. The method can also include displaying, with the touch screen display of the at least one tertiary computing device, successively according to the first predetermined order, each screen display of the screen displays associated with the first plurality of actions. The method can also include receiving, with the touch screen display of the at least one tertiary computing device, one or more customer inputs during said displaying. The method can also include communicating, from the at least one tertiary computing device to the at least one secondary server computing device, the one or more customer inputs received during said displaying. The method can also include directing a command, from the at least one secondary server computing device to at least one electro-mechanical device within the tunnel of the car wash, in response to the one or more customer inputs received during said communicating. The method can also include storing the workflow in a memory of a primary server computing device having one or more processors, off-site of the car wash, in addition to said storing in the memory of the at least one secondary server computing device. The method can also include controlling, with at least one of the primary server computing device and the at least one secondary server computing device, a first portion of the data of the workflow from alteration through the at least one secondary server computing device, wherein the first portion of the data of the workflow includes the first plurality of actions and the first predetermined order. The method can also include executing, on the at least one secondary server computing device, a workflow builder module to alter a second portion of the data of the workflow. The executing can also include controlling a second display, with the at least one secondary server computing device, to concurrently display the first portion of the data of the workflow and the second portion of the data of the workflow. The first portion of the data of the workflow can be displayed as a flow diagram including a first plurality of symbols including a start symbol and an end symbol. The first plurality of symbols can be disposed along a primary path between the start symbol and the end symbol. Each symbol of the first plurality of symbols can correspond to at least one of the first plurality of actions and to the respective screen display. The first plurality symbols can be arranged along the primary path according to the first predetermined order. The second portion of the data of the workflow can include a first plurality of buttons, each selectable by a user of the workflow builder module, and at least one sub-path. The sub-path can be displayed in response to selection of one of the first plurality of buttons and can branch away from a first predetermined position along the primary path and rejoin the primary path at a second predetermined position along the primary path. Both the first predetermined position and the second predetermined position can lie between the start symbol and the end symbol along the primary path. At least one symbol can be disposed along the at least one sub-path between the first predetermined position and the second predetermined position. The at least one symbol can be disposed along the at least one sub-path and can correspond to at least one action not included in the first plurality of actions and also correspond to a screen display associated with the at least one action, wherein the screen display associated with the at least one action is not included in the first plurality of screen displays. The method can also include displaying, with the display of the at least one tertiary computing device, the screen display not included in the first plurality of screen displays in addition to at least most of the screen displays associated with the first plurality of actions after said controlling the second display.

According to other features, said controlling the second display can be further defined as controlling, with the at least one secondary server computing device, the second display to display a portion of the at least one sub-path along which the at least one symbol is disposed as parallel to the primary path. Said controlling the second display can be further defined as controlling the second display to alter the display of the primary path, in response to the display of the at least one sub-path, wherein spacing between the first plurality of symbols is changed and position the at least one symbol along the portion of the at least one sub-path adjacent to a gap between two of the first plurality of symbols.

In other features, said controlling the second display can be further defined as controlling, with the at least one secondary server computing device, the second display to alter the display of the primary path, in response to the display of the at least one sub-path, wherein at least one more symbol is added to the primary path. The at least one more symbol added to the primary path can be further defined as the first predetermined position. The at least one sub-path can be further defined as a plurality of sub-paths, each displayed in response to selection of a particular one of the first plurality of buttons, each of the plurality of sub-paths can branch away from the first predetermined position along the primary path and rejoins the primary path at the second predetermined position along the primary path, wherein both the first predetermined position and the second predetermined position can lie between the start symbol and the end symbol along the primary path, wherein at least one symbol can be disposed along each of plurality of sub-paths between the first predetermined position and the second predetermined position, and wherein the respective at least one symbol disposed along each of the plurality of sub-paths corresponds to at least one screen display is not included in the first plurality of screen displays. Said controlling the second display can be further defined as controlling, with the at least one secondary server computing device, the second display to display respective portions of each of the plurality of sub-paths along which the respective at least one symbols are disposed as parallel to the primary path.

According to additional features, the at least one sub-path can be further defined as a plurality of sub-paths, each displayed in response to selection of a particular one of the first plurality of buttons. The plurality of sub-paths can include a first sub-path that branches away from the first predetermined position along the primary path and rejoins the primary path at the second predetermined position along the primary path. Both the first predetermined position and the second predetermined position can lie between the start symbol and the end symbol along the primary path. The at least one symbol can be disposed along the first sub-path between the first predetermined position and the second predetermined position. The at least one symbol can be disposed along the first sub-path and can correspond to at least one screen display not included in the first plurality of screen displays. The plurality of sub-paths can also include a second sub-path that branches away from a third predetermined position along the primary path and rejoins the primary path at a fourth predetermined position along the primary path. Both the third predetermined position and the fourth predetermined position can lie between the start symbol and the end symbol along the primary path. Both the third predetermined position and the fourth predetermined position can be different from one another and different from both of the first predetermined position and the second predetermined position. The at least one symbol can be disposed along the second sub-path between the third predetermined position and the fourth predetermined position. The at least one symbol can be disposed along the second sub-path and can correspond to at least one screen display not included in the first plurality of screen displays.

According to other features, said executing the workflow builder module can further include uploading, at the at least one secondary server computing device, at least one image to replace an image included in the first plurality of graphical elements. Executing the workflow builder module can further include uploading, at the at least one secondary server computing device, at least one image for inclusion in the first plurality of graphical elements after said storing in the memory of the at least one secondary server computing device.

In other features, said executing the workflow builder module, after said controlling the second display to concurrently display the first portion of the data of the workflow as a flow diagram and the second portion of the data of the workflow including the first plurality of buttons, can further include controlling, with the at least one secondary server computing device, the second display to display the first plurality of actions as a second plurality of symbols in the form of a second plurality of buttons, each of the second plurality of buttons selectable by the user. Each symbol of the second plurality of symbols can correspond to at least one of the first plurality of actions and to the respective screen display. The second display can be further controlled to display a second plurality of graphical elements configured for changing a respective screen display in response to a selection by the user of the corresponding one of the second plurality of symbols. The second plurality of graphical elements can include a first graphical element to select a layout of the respective screen display, wherein the layout defines at least one portion of the respective screen display for display of a request for input.

According to additional features, the first graphical element can be a pull-down menu. Said executing the workflow builder module, after said controlling, with the at least one secondary server computing device, the second display to display the second plurality of graphical elements, can further include controlling, with the at least one secondary server computing device, the second display to display a menu of options for a content of the at least one portion of the respective screen display in response to selection of the first graphical element by the user. The method can further comprise determining, with the primary server computing device, the options displayed in the menu in response to the first predetermined order. The method can further include confirming, with one of the primary server computing device and the at least one secondary server computing device, one or more changeable attributes of the respective screen display have been selected by the user using the second plurality of symbols before displaying the respective screen display on the at least one tertiary computing device. Said fetching can be further defined as accessing, with the at least one tertiary computing device, each screen display of the screen displays associated with the first plurality of actions with a web browser application.

A system for controlling operations of a car wash can include a primary server computing device, at least one secondary server computing device, and at least one tertiary computing device. The primary server computing device can have a first memory and one or more processors. The primary server computing device can be configured to communicate with a plurality of remote computing devices and can be off-site from the car wash. A workflow can be stored in the first memory. The workflow can include data defining (i) at least a first plurality of actions, (ii) a screen display associated with each of the first plurality of actions, (iii) a first plurality of graphical elements displayed in one or more of the screen displays associated with the first plurality of actions, and (iv) a first predetermined order of displaying the screen displays associated with the first plurality of actions. The at least one secondary server computing device can have a second memory and one or more processors and can be positioned on-site at the car wash. The workflow can also be stored in the second memory. The at least one secondary server computing device and the primary server computing device can be configured to communicate with one another. The at least one secondary server computing device can be configured to direct a command to at least one electromechanical peripheral positioned within the tunnel of the car wash. At least one of the primary server computing device and the at least one secondary server computing device can control a first portion of the data of the workflow from alteration through the at least one secondary server computing device. The first portion of the data of the workflow can include the first plurality of actions and the first predetermined order. The at least one secondary server computing device can include a workflow builder module to alter a second portion of the data of the workflow. The at least one tertiary computing device can have one or more processors and include a touch screen display. The at least one tertiary computing device can be positioned along a pathway extending through a tunnel of the car wash. The at least one tertiary computing device can be configured to fetch from the at least one secondary server computing device the screen displays associated with the first plurality of actions. The at least one tertiary computing device can be further configured to display with the touch screen display each screen display of the screen displays associated with the first plurality of actions successively according to the first predetermined order. The at least one tertiary computing device can be further configured to receive one or more customer inputs with the touch screen display. The at least one tertiary computing device can be further configured to communicate the one or more customer inputs received with the touch screen display to the at least one secondary server computing device. The at least one secondary server computing device can be further configured to, in executing the workflow builder module, to control a second display to concurrently display the first portion of the data of the workflow and the second portion of the data of the workflow. The first portion of the data of the workflow can be displayed as a flow diagram including a first plurality of symbols including a start symbol and an end symbol. The first plurality of symbols can be displayed disposed along a primary path between the start symbol and the end symbol. Each symbol of the first plurality of symbols corresponds to at least one of the first plurality of actions and to the respective screen display. The first plurality symbols can be displayed arranged along the primary path according to the first predetermined order. The second portion of the data of the workflow can be displayed as a first plurality of buttons, each selectable by a user of the workflow builder module, and at least one sub-path, displayed in response to selection of one of the first plurality of buttons. The at least one sub-path can be displayed branching away from a first predetermined position along the primary path and rejoining the primary path at a second predetermined position along the primary path. Both the first predetermined position and the second predetermined position can lie between the start symbol and the end symbol along the primary path. At least one symbol can be disposed along the at least one sub-path between the first predetermined position and the second predetermined position. The at least one symbol disposed along the at least one sub-path can correspond to at least one action not included in the first plurality of actions and to a screen display associated with the at least one action and not included in the first plurality of screen displays. The touch screen display of the at least one tertiary computing device can further be configured to display the screen display not included in the first plurality of screen displays in addition to at least most of the screen displays associated with the first plurality of actions.

In other features, the at least one tertiary computing device can be further defined as a kiosk fixed closer to an entrance of the tunnel than to an exit of the tunnel. The at least one tertiary computing device can further be defined as a tablet moveable relative to an entrance of the tunnel and an exit of the tunnel.

BRIEF DESCRIPTION OF THE DRAWINGS

The detailed description set forth below references the following drawings.

DETAILED DESCRIPTION

Figure 1:
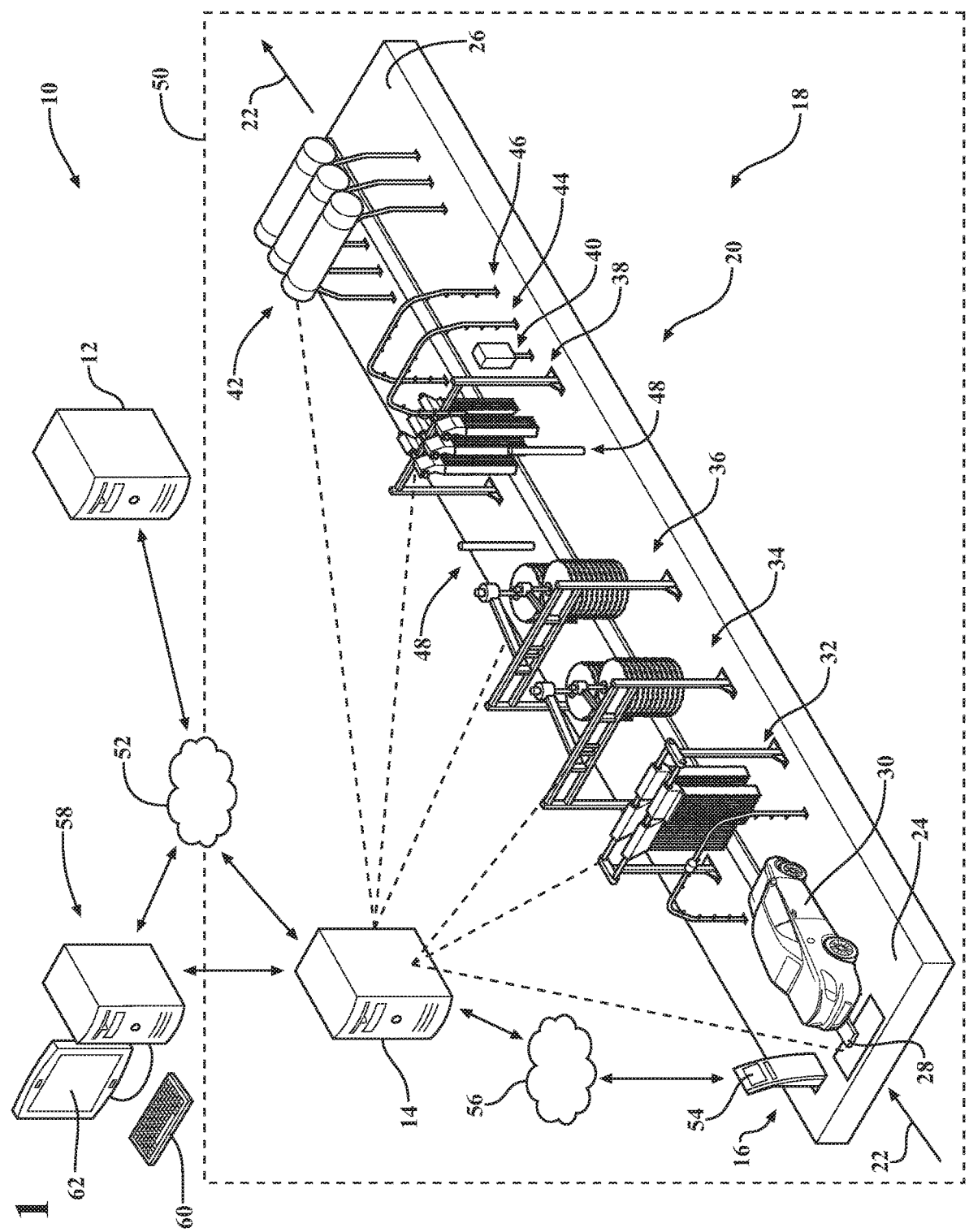
FIG. 1 is a schematic of car wash including a system for controlling one or more operations of the car wash according to an exemplary embodiment of the present disclosure.

The present disclosure, as demonstrated by the exemplary embodiment described below, provides a practical improvement in the operation of control systems for car washes. Control systems for car washes according to the present disclosure coordinate the activation of electromechanical devices in a tunnel of a car wash with the selection of such electromechanical devices by a user of the car wash (a customer of the car wash). The user of the car wash can select the electromechanical devices, indirectly, through the selection of a car wash option that is presented by the control system. For example, a first level, "minimal" car wash option can correspond to the application of a first plurality of electromechanical devices including one or more brushes, mitters, sprayers with valves, and/or blowers/dryers to the user's vehicle in addition to the application of a conveyor system to move the user's vehicle through the tunnel. Sprayers of the first plurality of electromechanical devices can spray water, detergent, foam, or a combination thereof.

A second, "better" level car wash option can correspond to the application of the first plurality of electromechanical devices to the user's vehicle and, further, a second plurality of electromechanical devices including one or more brushes, sprayers with valves, and/or blowers/dryers to the user's vehicle in addition to the application of the conveyor system to move the user's vehicle through the tunnel. For example, the second level of car wash option can include brushes and sprays directed particularly at the wheels and/or underside of the vehicle, which would not have been included in the exemplary first plurality of electromechanical devices.

A third, "best" level car wash option can correspond to the application of the first and second pluralities of electromechanical devices to the user's vehicle and, further, a third plurality of electromechanical devices including one or more brushes, sprayers with valves, and/or blowers/dryers to the user's vehicle in addition to the application of the conveyor system to move the user's vehicle through the tunnel. For example, the third level of car wash option can include sprays that direct a clear coat solution or wax at the vehicle, which would not have been included in the exemplary first or second pluralities of electromechanical devices.

The control system for the car wash according to the present disclosure intakes the user's selection of a car wash option and directs the activation of appropriate electromechanical device(s) in the tunnel of the car wash. The control system for the car wash according to the present disclosure can present the available options to the user through screen displays that are displayed by a touch screen display and can also intake the user's selection as an input through the touch screen display. To maintain the efficient operation of the car wash, the control system can control the order of display of the screen displays as well as the content of each screen display. Electromechanical devices within the tunnel can change and this, as well as other factors, can make changes to the screen displays necessary. However, changes to the screen displays that are used for soliciting input from the user can create downtime for the electromechanical devices within the tunnel if the changes alter the order of the display of the screen displays or create inconsistent commands. Further, the complexity of the control system can preclude an operator of the car wash from making a necessary change himself/herself, creating downtime for the electromechanical devices within the tunnel or detracting from the efficient operation of the electromechanical devices within the tunnel until an engineer having expertise in the control system can implement the change.

An exemplary embodiment of the present disclosure provides a solution to this problem that specifically arises in the realm of control systems for car washes. As illustrated in FIG. 1, an exemplary system 10 for controlling at least some of the operations of a car wash 18 includes a primary server computing device 12, a secondary server computing device 14, and a tertiary computing device 16. The exemplary system 10 is part of the exemplary, integrated car wash 18. The exemplary car wash 18 also includes a building structure defining a tunnel 20. In FIG. 1, the building structure has been omitted so that electromechanical devices disposed within the tunnel 20 are visible. A pathway 22 extends through the exemplary tunnel 20, between an upstream end 24 of the tunnel 20 to a downstream end 26 of the tunnel 20.

A plurality of electromechanical devices is disposed in the exemplary tunnel 20. The exemplary plurality of electromechanical devices includes a conveyor 28 configured to engage vehicles, such as vehicle 30, and move the vehicle 30 along the path 22 from the upstream end 24 to the downstream end 26. The exemplary plurality of electromechanical devices also includes an opposed pair of rotatable brushes, referenced at 32, configured to remove debris from the sides of the vehicle 30. The exemplary plurality of electromechanical devices also includes opposed sprayers with valves, referenced at 34. The exemplary opposed sprayers with valves 34 can be configured to spray water, detergent, foam, a combination thereof, or some other fluid such as wax or clear coat. The exemplary plurality of electromechanical devices also includes a second group of opposed sprayers with valves, referenced at 36, that can be configured to spray water, detergent, foam, a combination thereof, or some other fluid such as wax or clear coat. The exemplary plurality of electromechanical devices also includes a mitter assembly 38 configured to be oscillated back and forth, laterally relative to the path 22, to remove debris from upwardly-facing surfaces of the vehicle 30. The exemplary plurality of electromechanical devices also includes an opposed pair of rotatable brushes (one is visible and referenced at 40) configured to remove debris from the wheels of the vehicle 30. The exemplary plurality of electromechanical devices also includes a plurality of blowers referenced at 42. The exemplary blowers 42 are configured to generate a flow of air to remove water from the vehicle 30 to dry the vehicle 30 before the vehicle 30 passes out of the tunnel 20 at the downstream end 26. The exemplary plurality of electromechanical devices also includes additional groupings of sprayers with valves, referenced at 44 and 46, that can be configured to spray water, detergent, foam, a combination thereof, or some other fluid such as wax or clear coat. It is noted that the particular order of exemplary plurality of electromechanical devices along the path 22 is illustrative and that other embodiments of the present disclosure can be practiced with electromechanical devices arranged differently. Further, the particular electromechanical devices included in the exemplary plurality of electromechanical devices are also illustrative and that other embodiments of the present disclosure can be practiced with different combinations of electromechanical devices.

The exemplary car wash can include one or more sensors positioned within the tunnel 20. An exemplary sensor array in the exemplary tunnel 20 is referenced at 48. Sensors of the sensor array 48 can sense one or more conditions within the tunnel 20 and communicate signals to the secondary server computing device 14 corresponding to sensed conditions. The secondary server computing device 14 can receive signals communicated by the sensors of the sensor array 48 and respond by changing the operation of one or more of the plurality of electromechanical devices or by communicating an alert.

The exemplary primary server computing device 12 has a first memory and one or more processors. The exemplary primary server computing device 12 is positioned off-site from the car wash 18. The box formed by dash line that is referenced at 50 schematically represents the boundary between on-site relative to the car wash 18 (within the box 50) and off-site relative to the car wash 18 (outside the box 50). The exemplary secondary server computing device 14 has a second memory and one or more processors. Any combination of one or more computer-usable or computer-readable media may be utilized as memory in various embodiments of the disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

The exemplary secondary server computing device 14 is positioned on-site at the car wash 18. The exemplary primary server computing device 12 and the exemplary secondary server computing device 14 are configured to communicate with one another over a network 52. The network 52 can include any number of computing devices that can communicate with each other. The network 52 can include a wide area network (WAN), e.g., the Internet. Embodiments of the present disclosure can be practiced with a wireless network 52, a hard-wired network 52, or any combination thereof. It is noted that the exemplary primary server computing device 12 is configured to communicate with a plurality of remote, secondary server computing devices such as the exemplary secondary server computing device 14.

The exemplary tertiary computing device 16 has one or more processors and includes a touch screen display 54. The exemplary tertiary computing device 16 is positioned along the pathway 22, closer to the upstream end 24 than to the downstream end 26. In the embodiment illustrated in FIG. 1, the tertiary computing device 16 takes the form of a kiosk. In another possible embodiment of the present disclosure, the tertiary computing device 16 could take the form of a tablet moveable relative to an entrance of the tunnel 20 and an exit of the tunnel 20. In another possible embodiment of the present disclosure, a plurality of tertiary computing devices could be utilized, one at each tunnel of a multi-tunnel car wash.

The exemplary secondary server computing device 14 and the exemplary tertiary computing device 16 are configured to communicate with one another over a network 56. The network 56 can include any number of computing devices that can communicate with each other. The network 56 can include a local area network (LAN), a wide area network (WAN), e.g., the Internet, or a combination thereof. Embodiments of the present disclosure can be practiced with a wireless network 56, a hard-wired network 56, or any combination thereof.

The exemplary primary server computing device 12 and/or the secondary server computing device 14 can be accessed by a computing device 58. The exemplary computing device 58 can utilized by an operator of the car wash 18, such as an owner of the car wash 18 or an employee of the owner of the car wash 18. The exemplary computing device 58 is illustrated as a desktop computer. In other embodiments of the present disclosure, the computing device 58 can be a laptop computer, a smart-phone, a tablet, an e-reader, or any other electronic computing device operable to run a web browser application. The exemplary computing device 58 includes a keyboard 60 and a display 62. The exemplary computing device 58 is illustrated as off-site relative to the car wash 18, but can be on-site in other embodiments of the present disclosure. The exemplary computing device 58 can be connected to the exemplary secondary server computing device 14 directly for communication, or can be connected through a network, such as network 52 or network 56 or another network.

In operation, a user of the car wash 18 can engage the tertiary computing device 16 in order to select a wash option and thus apply the operations of one or more of the plurality of electromechanical devices to the vehicle 30. In one or more embodiments of the present disclosure, the user can drive the vehicle 30 to be adjacent to the tertiary computing device 16 so that the user can access the tertiary computing device 16 through the window of the driver-side door of the vehicle 30. In one or more embodiments of the present disclosure, the user can engage the touch screen display 54 of the tertiary computing device 16. The tertiary computing device 16 can display a series of screen displays on the touch screen display 54. Each screen display represents and corresponds to an action of the system 10. One or more of the screen displays can also represent and correspond to an input sought by the system 10 from the user in order to properly control the plurality of electromechanical devices disposed in the tunnel 20. The system 10 can proceed through screens/actions to properly control the electromechanical devices positioned in the tunnel 20.

The term "workflow" is used herein for the cumulative actions carried out by the system 10 when engaged by the customer and also for the screen displays displayed on the touch screen display 54 that correspond to the actions carried out by the system 10. The workflow can be executed by the system 10 and, in response to the conclusion of the workflow, the system 10 controls the plurality of electromechanical devices through the secondary server computing device 14. It is noted that FIG. 1 discloses the secondary server computing device 14 in direct contact with and thus in direct control of electromechanical devices positioned in the tunnel 20. It is noted that in other embodiments of the present disclosure, a secondary server computing device that is onsite can communicate with another computing device that is in direct contact with and thus in direct control of electromechanical devices positioned in the tunnel 20. In such an embodiment, that secondary server computing device would be in indirect contact with and thus not in direct control of electromechanical devices positioned in the tunnel 20. The workflow can include data defining (i) at least a first plurality of actions, (ii) a screen display associated with each of the first plurality of actions, (iii) a first plurality of graphical elements displayed in one or more of the screen displays associated with the first plurality of actions, and (iv) a first predetermined order of displaying the screen displays associated with the first plurality of actions.

In the exemplary embodiment of the present disclosure, the workflow is stored in the first memory of the primary server computing device 12 and the secondary server computing device 14. In the exemplary embodiment of the present disclosure, there is a bi-directional replication of the databases between local applications running on the secondary server computing device 14 and the primary server computing device 12. The workflow data is thus synced in the memories of the first and secondary server computing devices 12, 14 in the exemplary embodiment. The first and second memories of the first and secondary server computing devices 12, 14 can store numerous, alternative workflows. The operator of the car wash 18 can select any one of the workflows stored in the first and second memories to be applied by the secondary server computing device 14 and the tertiary computing device 16.

Modifying workflows and creating new workflows raise the risk of causing disruption(s) in the operation of the plurality of electromechanical devices. For example, a workflow may be modified and change the order of actions so that input needed for a particular action is not possessed by the system 10 when needed. Further, the creation of a new workflow might fail to include an action necessary for the operation of the plurality of electromechanical devices. Such disruptions will cause slowdown or shutdown or errors in processes to be executed by the plurality of electromechanical devices. Further, the operator of the car wash 18 may not have the expertise to modify the data associated with the workflow.

In the exemplary embodiment of the present disclosure, the system 10 can bifurcate the workflow into first and second portions that are differentiated based at least on access for modification. While the workflow can be jointly stored at the primary and secondary server computing devices 12, 14 to remove vulnerability of the car wash 18 to communication interruptions, the system 10 can bifurcate the workflow into the first and second portions to minimize the extent of the workflow that is subject to relatively tight control against modification. This is discussed in greater detail below.

Referring now to FIG. 2, the primary server computing device 12 can be a cloud server and can be used by the operator of the car wash 18 to manage the operation of the car wash 18. The memory of the primary server computing device 12 is referenced by a database 64. It is noted that the primary server computing device 12 can be viewed as an application or a suite of applications running on a physical server in one or more embodiments of the present disclosure, rather than the physical server itself. The portions of the exemplary primary server computing device 12 denoted as "SiteManager" in FIG. 2 are accessed by the operator of the car wash 18 to manage the operations of the car wash 18. The portions of the exemplary primary server computing device 12 denoted as "CustomerManager" in FIG. 2 can be used by the operator of the exemplary primary server computing device 12 to manage a plurality of car wash operators that utilize the SiteManager portion of the primary server computing device 12.

The SiteManager application(s) can be engaged and accessed primarily by car wash operators, but can also be accessed by the operator of the exemplary primary server computing device 12 in some instances for support purposes, such as to modify a workflow. As set forth above, in the exemplary embodiment of the present disclosure, the system 10 provides an improvement, a practical application, in that the operator of the car wash is more able to modify a workflow and may rely less on the operator of the exemplary primary server computing device 12. The SiteManager application(s) can be managed (deployed, upgraded, monitored) by the operator of the exemplary primary server computing device 12. The SiteManager application(s) can manage the software installed on the secondary server computer device 14 and, as noted above, there can be a bi-directional replication of the database between the local applications running on the primary and secondary server computing devices 12, 14. The exemplary CustomerManager application(s) is engaged and accessed only by the operator of the exemplary primary server computing device 12.

The memory of the secondary server computing device 14 is referenced by a database 66. The point of sale (POS) application of the secondary server computing device 14 can be engaged and accessed primarily by the operator of the car wash 18. This application can be the one that employees of the car wash 18 utilize to clock in/out for shifts and run the wash operations. The exemplary secondary server computing device 14 can be locked down with security templates placed by the operator of the system 10 to limit what operations the operator of the car wash 18 can perform on the exemplary secondary server computing device 14.

In the exemplary embodiment of the present disclosure, one of the tools/applications available through the SiteManager application user interface 68 is the workflow builder module 70. It is noted that the "user" referred to in FIG. 2 is the operator of the car wash 18 and not the user of the car wash 18. The workflow builder module 70 can be embodied entirely in hardware, entirely in software (including firmware, resident software, micro-code, etc.), or embodied in a combination of software and hardware. The operator of the car wash 18 can use the computing device 58 to log into the SiteManager application and access the workflow builder module 70 to create or modify a workflow. As noted above, a workflow defines the process that the system 10 will follow in engaging a user of the car wash and is carried out through the tertiary computing device 16. The outcome of the workflow dictates that utilization of the plurality of electromechanical devices. The exemplary workflow builder module 70 includes a "base workflow" that the operator of the car wash 18 can customize relative to appearance-related attributes (displayed text, media, wallpaper, theme). The operator of the car wash 18 can also modify the base workflow by introducing alternate flows, as will be described in greater detail below.

In the exemplary embodiment of the present disclosure, a workflow is not transferred to the tertiary computing device 16 and is not stored on the tertiary computing device 16. The workflow can be replicated from the SiteManager application on the primary server computing device 12 to the secondary server computing device 14. The exemplary secondary server computing device 14 acts as a web server to serve up the applications for the car wash 18. The tertiary computing device 16 runs a web browser that navigates to the web server running on the secondary server computing device 14, which serves up the workflow as a web application. During the execution of the workflow by the system 10, the tertiary computing device 16 can fetch the screen displays associated with the first plurality of actions from the at least one secondary server computing device 14. The tertiary computing device 16 can display, on the touch screen display 62, successively according to the first predetermined order, each screen display of the screen displays associated with the first plurality of actions. In the exemplary embodiment of the present disclosure, the tertiary computing device 16 is not utilized by the operator of the car wash 18 to create or modify a workflow. It is also noted that, in the exemplary embodiment of the present disclosure, software operating on the tertiary computing device 16 is updated by the SiteManager application, through the secondary server computing device 14.

FIG. 2 also references peripheral connectors at 72. The exemplary system 10 can communicate commands, or signals that will be converted to commands, for the plurality of electromechanical devices in the tunnel 20. Data flows through an application called the peripheral router 74, running on the secondary server computing device 14, to get from the tertiary computing device 16 to the controllers in the tunnel so that the user receives the wash that was requested.

Figure 2A:
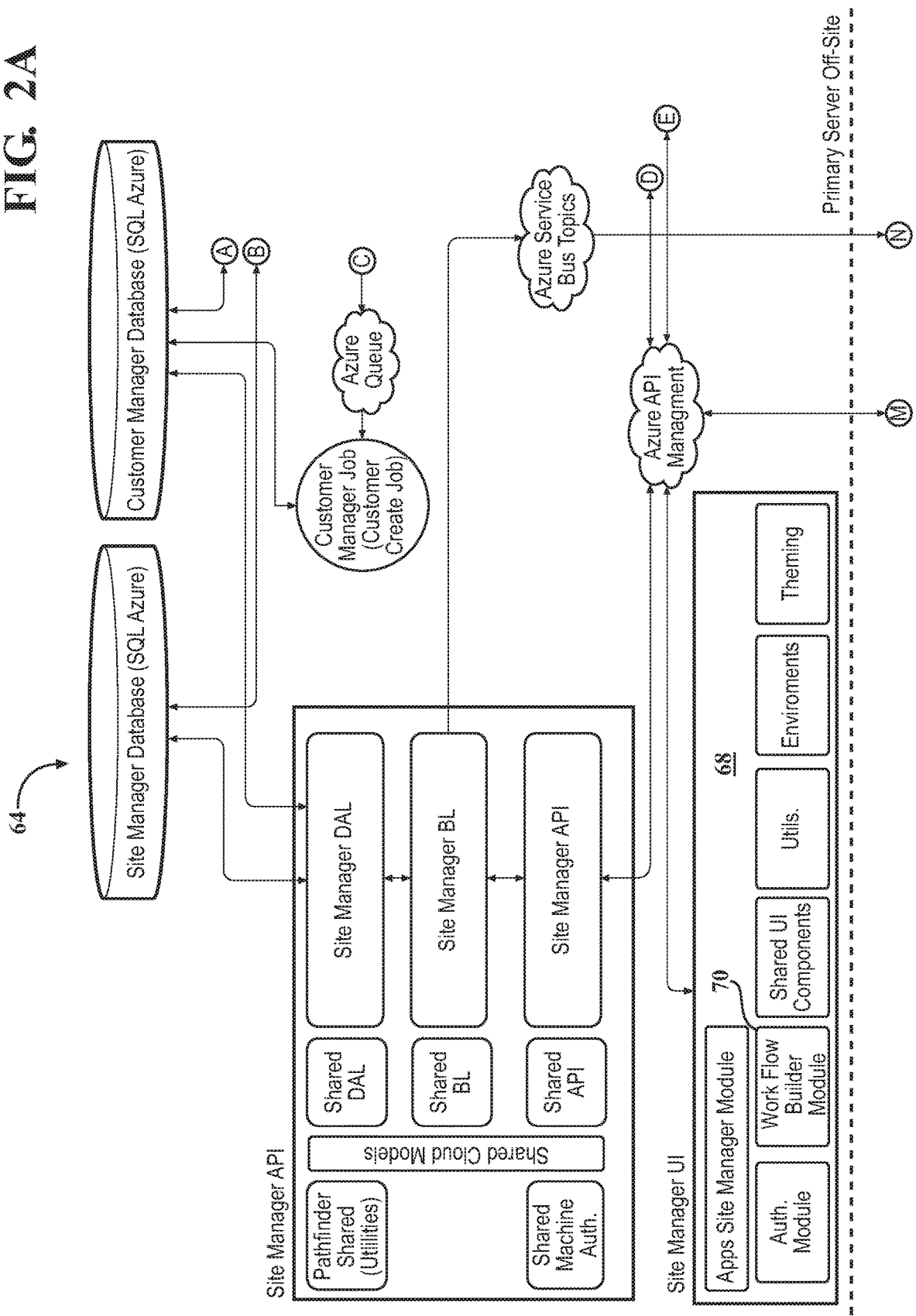
FIGS. 2A-2D are portions of a schematic of server computing devices included in the exemplary system shown in FIG. 1.

For FIG. 2A, it is noted that within the SiteManager API box the Pathfinder.Shared, Shared.Machine Auth, the Shared.Cloudmodules, the Shared.DAL, the Shared.BL, and the Shared.API are shared Assembly C# files. The SiteManager.DAL, the SiteManager.BL, and the SiteManager.API are application Assembly C# files. Within the SiteManager UI box, the AppSiteManagerModule is a Javascript module. The AuthModule, WorkflowBuilderModule, the SharedUIComponents, the Utils, the Environments, and the Theming are shared Javascript modules.

Figure 2B:
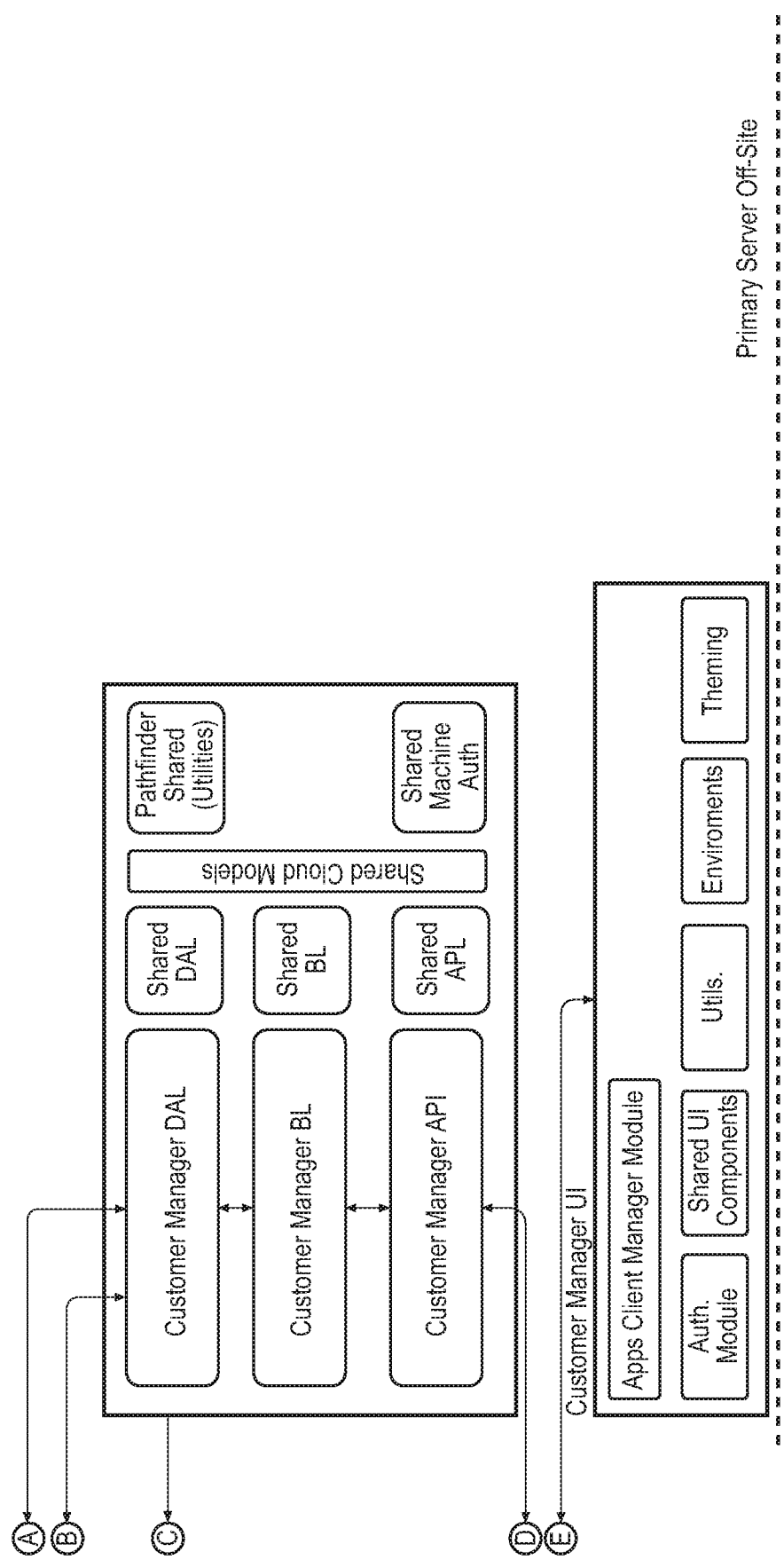

For FIG. 2B, it is noted that within the CustomerManager API box the CustomerManager.DAL, the CustomerManager.BL, and the CustomerManager.API are application Assembly C# files. The Pathfinder.Shared, Shared.Machine Auth, the Shared.Cloudmodules, the Shared.DAL, the Shared.BL, and the Shared.API are shared Assembly C# files. Within the CustomerManager UI box, the AppsClientManagerModule is a Javascript module. The AuthModule, the SharedUIComponents, the Utils, the Environments, and the Theming are shared Javascript modules.

Figure 2C:
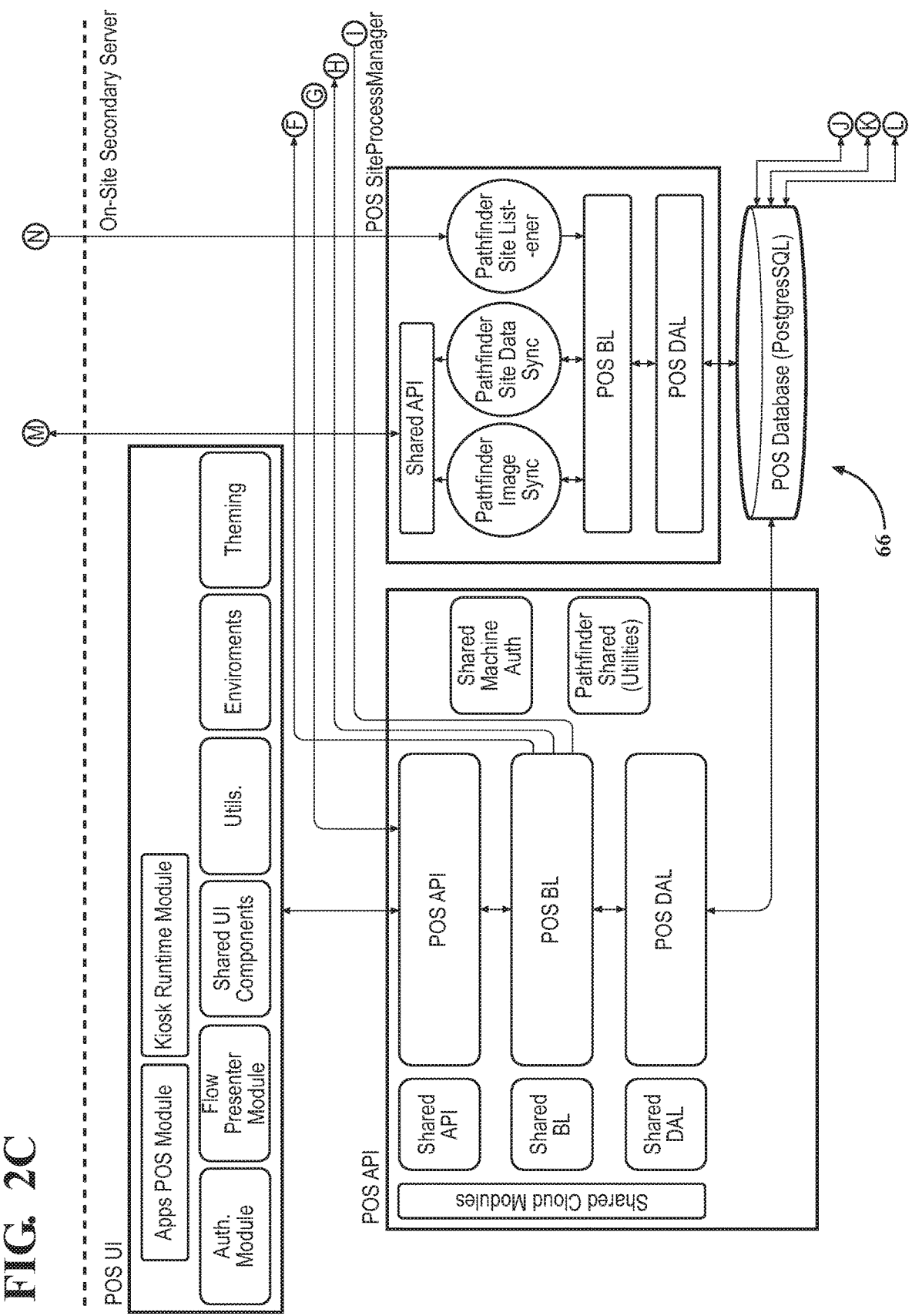

For FIG. 2C, it is noted that within the POS API box the POS.DAL, the POS.BL, and the POS.API are application Assembly C# files. The Pathfinder.Shared, Shared.Machine Auth, the Shared.Cloudmodules, the Shared.DAL, the Shared.BL, and the Shared.API are shared Assembly C# files. Within the POS UI box, the AppsPOSModule and the KioskRunTimeModule are Javascript modules. The AuthModule, the FlowPresenter Module, the SharedUIComponents, the Utils, the Environments, and the Theming are shared Javascript modules. Within the POS.SiteProcessManager box, the Shared.API is a shared Assembly C# file. The POS.BL and POS.Dal are application Assembly C# files. The Pathfinder.ImageSync, the Pathfinder.SiteDataSync, and the Pathfinder.SiteListener background services.

Figure 2D:
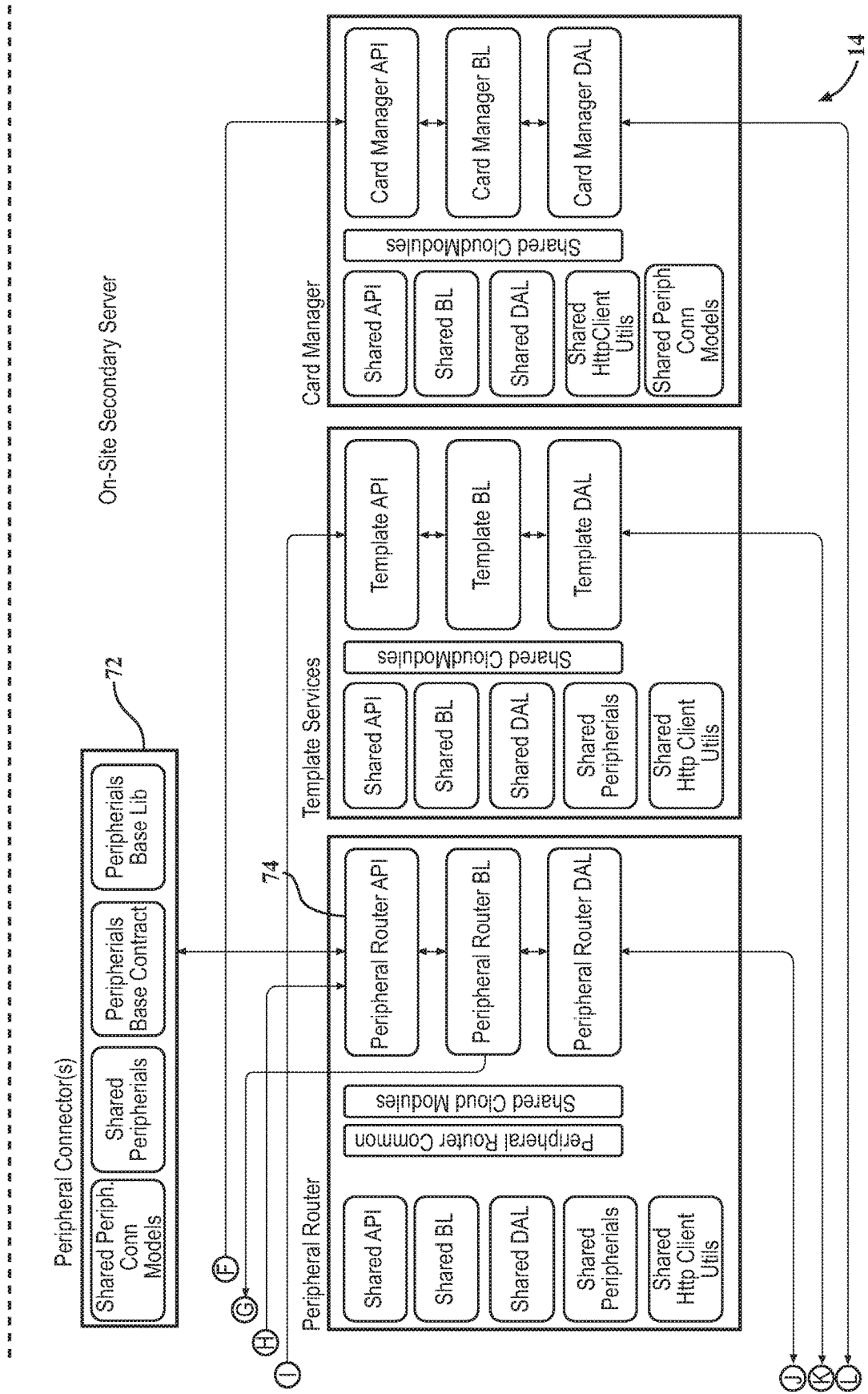

For FIG. 2D, it is noted that within the Peripheral Connector(s) box, the Shared.PeriphConnModels and Shared.Peripherals are shared Assembly C# files. The Peripherals.BaseContract and the Peripherals.BaseLib are application Assembly C# files. Within the Peripheral Router box, the PeripheralRouter.DAL, the PeripheralRouter.BL, the PeripheralRouter.API, and the PeripheralRouter.Common are application Assembly C# files. The Shared.Peripherals, the Shared.Cloudmodules, the Shared.DAL, the Shared.BL, the Shared.HttpClientUtilis, and the Shared.API are shared Assembly C# files. Within the Template Services box, the Template.DAL, the Template.BL, and the Template.API are application Assembly C# files. The Shared.Peripherals, the Shared.Cloudmodules, the Shared.DAL, the Shared.BL, the Shared.HttpClientUtilis, and the Shared.API are shared Assembly C# files. Within the Card Manager box, the CardManager.DAL, the CardManager.BL, and the CardManager.API are application Assembly C# files. The Shared.Peripherals, the Shared.Cloudmodules, the Shared.DAL, the Shared.BL, the Shared.HttpClientUtilis, and the Shared.API are shared Assembly C# files.

In one or more embodiments of the present disclosure, a point of sale (POS) device such as an Europay Mastercard Visa (EMV) chip/card reader can be installed at the tertiary computing device 16. The EMV chip/card reader can run an embedded application which communicates directly with a card clearing provider from one of the financial networks (such Vantiv for example). All card processing can happen between the POS device and the financial network without any intervention by the system 10. The result of the payment transaction is communicated from the POS device to the tertiary computing device 16 and stored on the secondary server computing device 14. The data can have been tokenized and otherwise redacted such that it is Payment Card Industry Data Security Standard (PCI) compliant prior to the system 10 having access to it. Transaction data can be uploaded to the primary server computing device 12 for analysis/data-mining. When the payment transaction has been successfully completed, the secondary server computing device 14 can emit commands to the particular electromechanical devices that will act on the vehicle 30. It is noted that, in one or more embodiments of the present disclosure, the signals/commands emitted by the secondary server computing device 14, in response to the successful completion of the payment transaction, can be received by one or more other computing devices, interpreted and directed to the particular electromechanical devices that will act on the vehicle 30. These one or more other computing devices can be controllers that are disposed between the secondary server computing device 14 and the particular electromechanical devices that will act on the vehicle 30.

Figure 3:
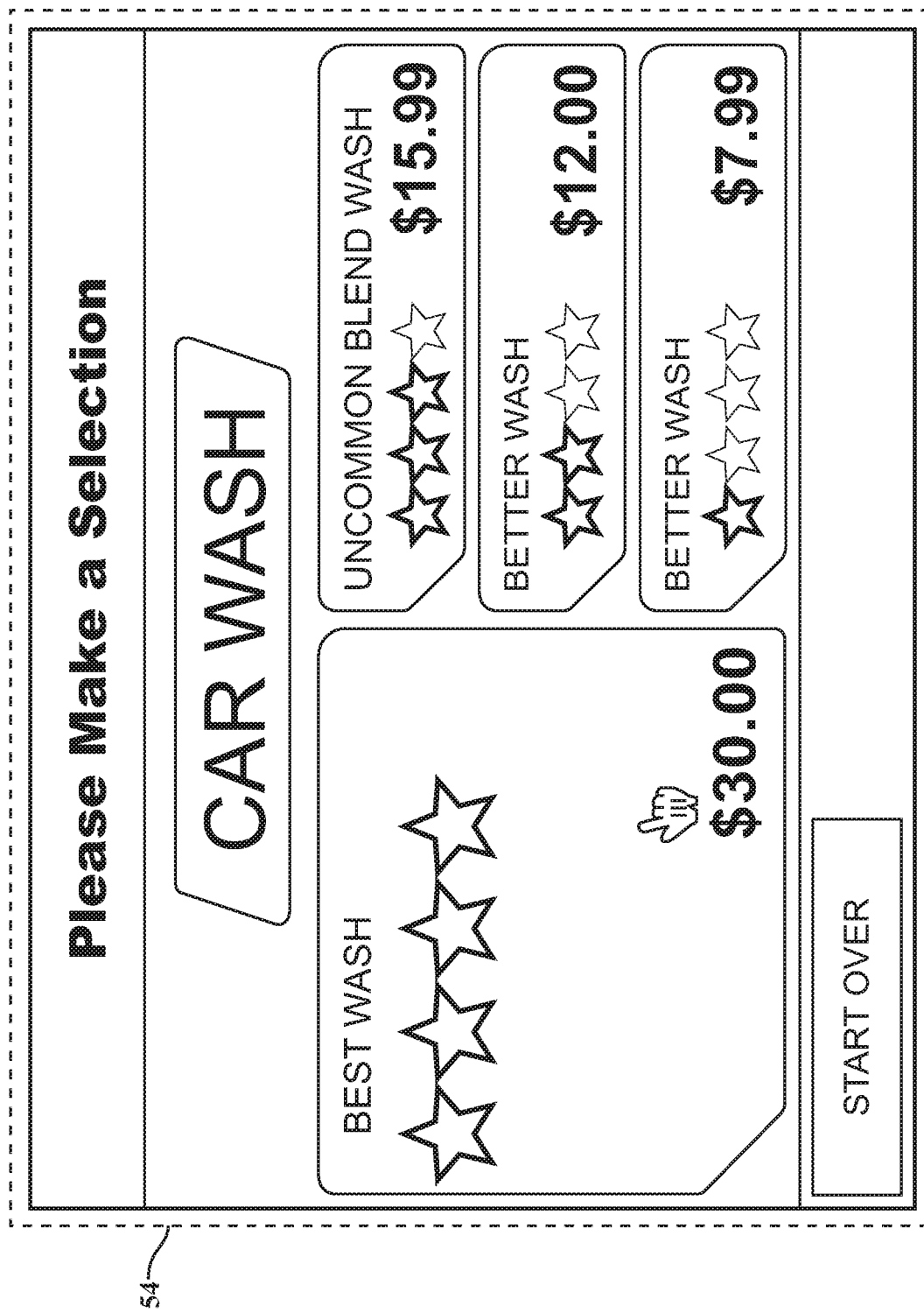
FIG. 3 is a first exemplary screen display generated by the exemplary system shown in FIGS. 1 and 2, presented to a user of the car wash.
Figure 4:
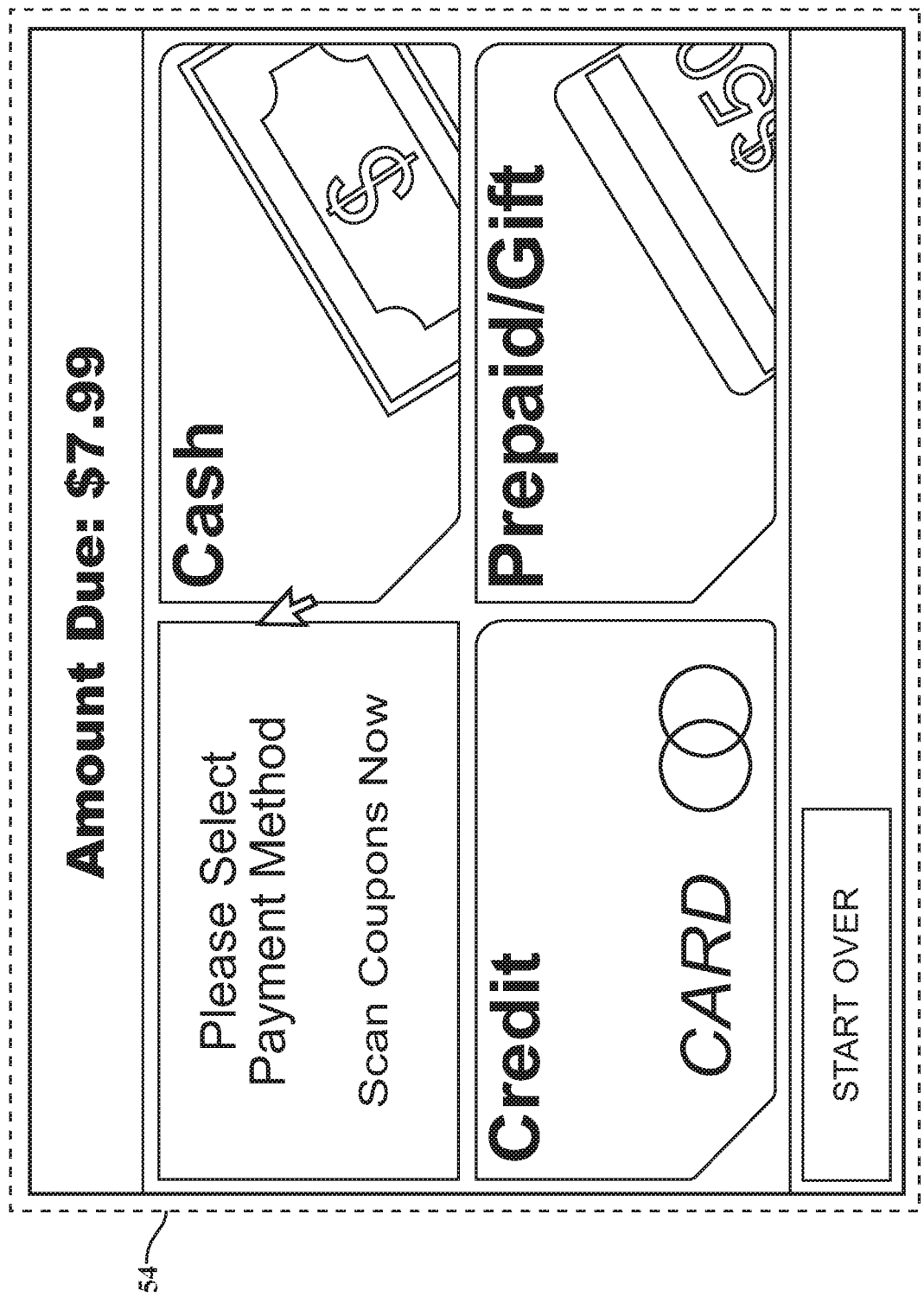
FIG. 4 is a second exemplary screen display generated by the exemplary system shown in FIGS. 1 and 2, presented to a user of the car wash.
Figure 5:
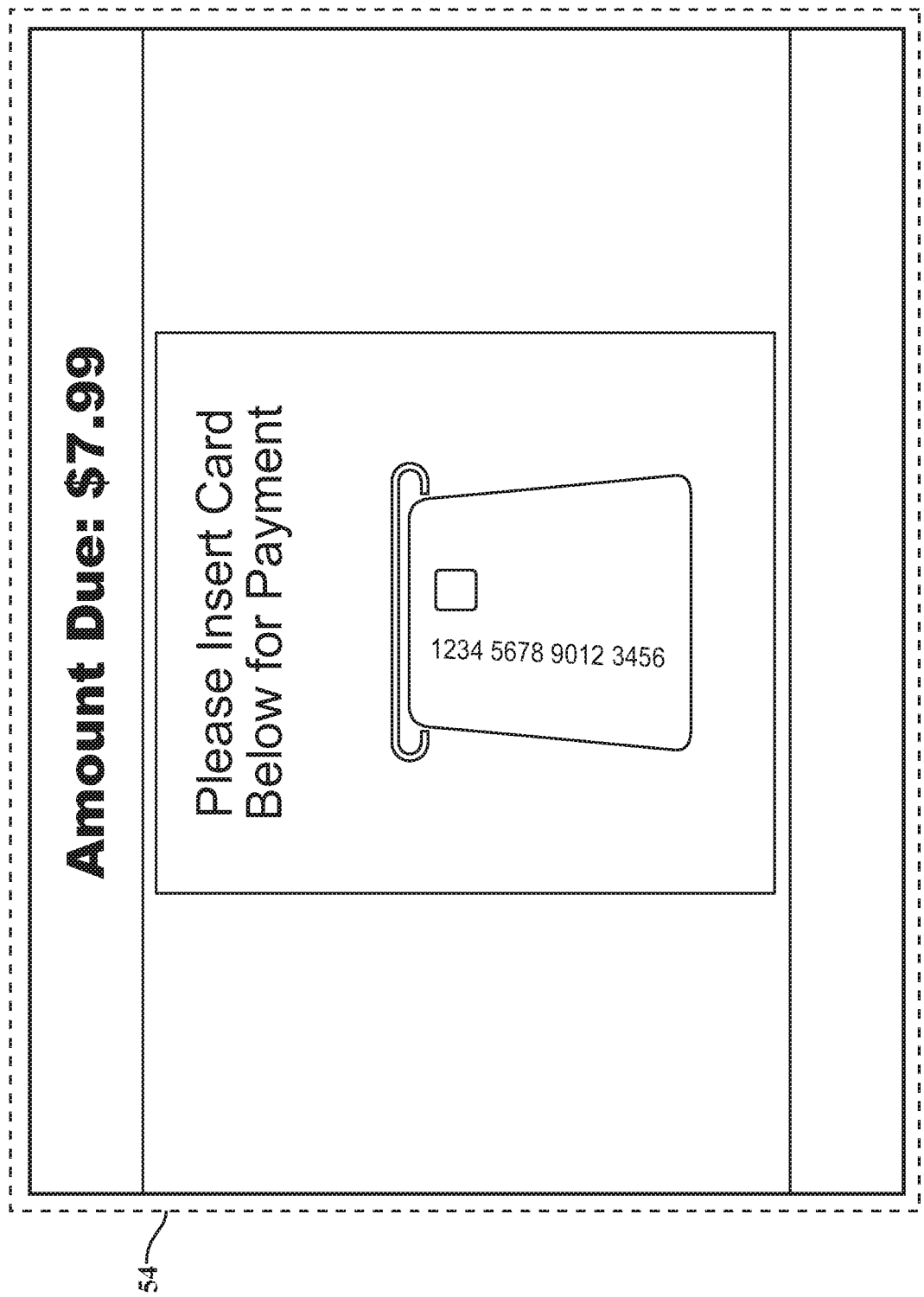
FIG. 5 is a third exemplary screen display generated by the exemplary system shown in FIGS. 1 and 2, presented to a user of the car wash.

FIGS. 3-5 illustrate exemplary screen displays the user of the car wash would see on the touch screen display 54 of the tertiary computing device 16 in one or more embodiments of the present disclosure. The exemplary screen displays shown in FIGS. 3-5 are displayed as the system 10 executes a presently-applied workflow. FIG. 3 is a first exemplary screen display displayed to the user of the car wash 18. It is noted that "first" and other numeric adjectives are used to distinguish and not to particularly designate an order. The exemplary "first" screen display may not be the first screen display displayed to the user of the car wash 18 in one or more embodiments of the present disclosure.

The tertiary computing device 16 can receive, with the touch screen display 62, one or more customer inputs during the display of the screen displays shown in FIGS. 3-5. In response to the first exemplary screen display of FIG. 3, the user of the car wash 18 (the customer) can select a level of car wash option: good, better, uncommon blend, or best. Choosing a "good" wash will result in the operation of a first plurality of the electromechanical devices positioned in the tunnel 20 in the exemplary embodiment of the present disclosure. Choosing a "better" wash will result in the operation of the first plurality of the electromechanical devices in the tunnel 20 and, further, a second plurality of electromechanical devices disposed in the tunnel 20 in the exemplary embodiment of the present disclosure. The "better" wash can include the operation of the first plurality of electromechanical devices on the vehicle 30 (associated with the "good" wash) as well as the operation of the second plurality of electromechanical devices on the vehicle 30 (not associated with the "good" wash). In the exemplary embodiment of the present disclosure, choosing an "uncommon blend" wash will result in the operation of some of the first plurality of the electromechanical devices in the tunnel 20 and, further, some of the second plurality of electromechanical devices disposed in the tunnel 20. This combination represents a third plurality of the electromechanical devices. The "best" wash can include the operation of all of the plurality of electromechanical devices on the vehicle 30.

FIG. 4 is a second exemplary screen display displayed to the user of the car wash 18 after the user has selected the good wash. The user of the car wash 18 is directed to indicate the method of payment for the selected wash: cash, credit, or prepaid/gift card. FIG. 5 is a third exemplary screen display displayed to the user of the car wash 18 after the user has selected credit or prepaid card as the method of payment. The tertiary computing device 16 communicates the customer inputs to the secondary server computing device 14. The secondary server computing device 14 can then direct commands to the electromechanical devices within the tunnel 20 of the car wash 18.

As noted above, it can become necessary to modify the workflow executed by the system 10, which may require modification of the screen displays presented to the user of the car wash 18. The exemplary embodiment of the present disclosure can allow the operator of the car wash 18 to modify the screen displays presented to the user of the car wash 18 when a workflow is modified. As noted briefly above, the workflow can include data defining (i) at least a first plurality of actions, (ii) at least one screen display associated with each of the first plurality of actions, (iii) a first plurality of graphical elements displayed in one or more of the screen displays associated with the first plurality of actions, and (iv) a first predetermined order of displaying the screen displays associated with the first plurality of actions. It is noted that "graphical elements" can take the form of text, images, wallpaper, and/or video. It is noted that the first predetermined order applies to the screen displays associated with the first plurality of actions. A change in a workflow may result in additional actions and thereby result in the addition of screen displays. The additional actions and associated screen displays can be arranged within/among the first plurality of actions and associated screen displays without changing the first predetermined order for the first plurality of actions. For example, a "second" predetermined order can include the first plurality of actions and additional actions, wherein the first plurality of actions are still executed in the first predetermined order.

The operator of the car wash 18 can use the computing device 58 to access the primary server computing device 12 or the secondary server computing device 14 to alter a workflow and/or create a new workflow. Changes to an existing workflow and the creation of a new workflow are controlled with at least one of the primary server computing device 12 and the at least one secondary server computing device 14, or both, so that a first portion of the data of the workflow is protected from alteration. This first portion can be referred to as a "base" workflow. In the exemplary embodiment of the present disclosure, the first portion of the data of the workflow includes the first plurality of actions and the first predetermined order. It is noted that the first portion of the data of the workflow cannot be altered by the operator of the system 10. In other words, in the exemplary embodiment, all workflows will include the first plurality of actions and those first plurality of actions will occur according to the first predetermined order. In the exemplary embodiment, the remainder of the data of the workflow can be modified by the operator of the car wash 18. For example, the operator of the car wash 18 can modify screen displays associated with the first plurality of actions and/or the graphical elements displayed in one or more of the screen displays associated with the first plurality of actions. In another example, the operator of the car wash 18 can add actions to supplement the base workflow.

Figure 6:
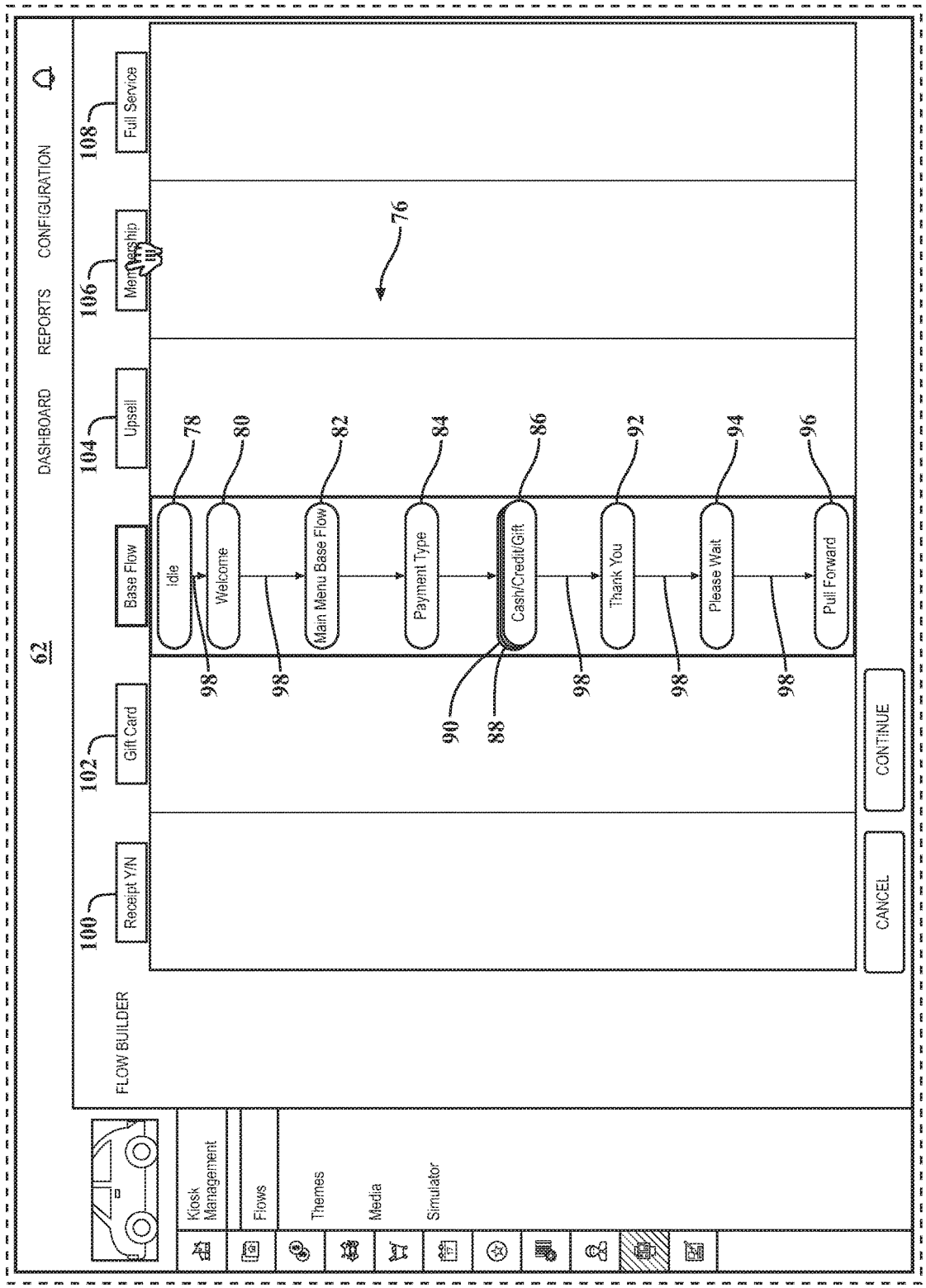
FIG. 6 is a first screen display generated by the exemplary system shown in FIGS. 1 and 2, presented to an operator of the car wash, wherein a first portion of data of a workflow is displayed as a flow diagram including a first plurality of symbols arranged along a primary path including a start symbol and an end symbol and wherein a second portion of the data of the workflow is shown to include a plurality of buttons.

The operator of the car wash 18 can use the computing device 58 to access the primary server computing device 12, or the at least one secondary server computing device 14 in other embodiments, to utilize the workflow builder module 70 and alter a workflow and/or create a new workflow. In executing the workflow builder module 70, the primary server computing device 12 can control the display 62 to concurrently display the first portion of the data of the workflow and the second portion of the data of the workflow. Referring now to FIG. 6, in the exemplary embodiment of the present disclosure, the first portion of the data of the workflow is shown as a flow diagram 76 including a first plurality of symbols 78, 80, 82, 84, 86, 88, 90, 92, 94, 96 wherein symbol 78 is a start symbol and symbol 96 is an end symbol. It is noted that the symbols 86, 88, 90 are shown in the display 62 as stacked since these symbols represents alternative options depending on the customer input. Each of the symbols 78-96 represents one of the first plurality of actions and thus also represents the screen displays respectively associated with one of the first plurality of actions. The symbol 82 corresponds to the screen display shown in FIG. 3. The symbol 84 corresponds to the screen display shown in FIG. 4. One of the symbols 86, 88, 90 corresponds to the screen display shown in FIG. 5.

The exemplary first plurality of symbols 78-96 are disposed along a primary path 98 between the start symbol 78 and the end symbol 96. In the exemplary embodiment, the symbol 78 represents the action of the system 10 idling until a customer engages the tertiary computing device 16. In the exemplary embodiment, the symbol 80 represents the action of the system 10 confirming to the customer that the system 10 is active and has received the initial customer input. In the exemplary embodiment, the symbol 82 represents the action of the system 10 soliciting the customer's input regarding the desired operations of the electromechanical devices in the tunnel 20, the level of wash. In the exemplary embodiment, the symbol 84 represents the action of the system 10 soliciting the customer's input regarding the desired form of payment for the desired operations. In the exemplary embodiment, the symbols 86, 88, 90 represent the actions of the system 10 soliciting the customer's input regarding the desired form of payment. In the exemplary embodiment, the symbol 92 represents the action of the system 10 confirming the acceptance of payment. In the exemplary embodiment, the symbol 94 represents the action of the system 10 directing the customer to hold the vehicle 30 in position until clearance on the pathway 22 is created for the vehicle 30. In the exemplary embodiment, the symbol 96 represents the action of the system 10 directing the customer to move the vehicle 30 forward on the pathway 22 until the vehicle 30 engages the conveyor system 28.

The exemplary first plurality symbols 78-96 are arranged along the primary path 98 according to the first predetermined order. In other words, the system 10 can maintain that the action represented by symbol 82 is executed before the actions represented by symbols 84-96. The workflow may be modified so that an additional action, not shown in FIG. 6, can be executed before or after the action represented by symbol 82, but the action represented by symbol 82 is executed before the actions represented by symbols 84-96.

In executing the workflow builder module 70, the primary server computing device 12 can control the display 62 to display the second portion of the data of the workflow as a first plurality of buttons 100, 102, 104, 106, and 108. Each button 100-108 is a form of graphical element that an operator of the car wash 20 can select in the graphical user interface presented by the workflow builder module 70 through the display 62. The selection of any of the buttons 100-108 by the operator of the car wash 20 results in an alteration of what is displayed on the display 62.

Figure 7:
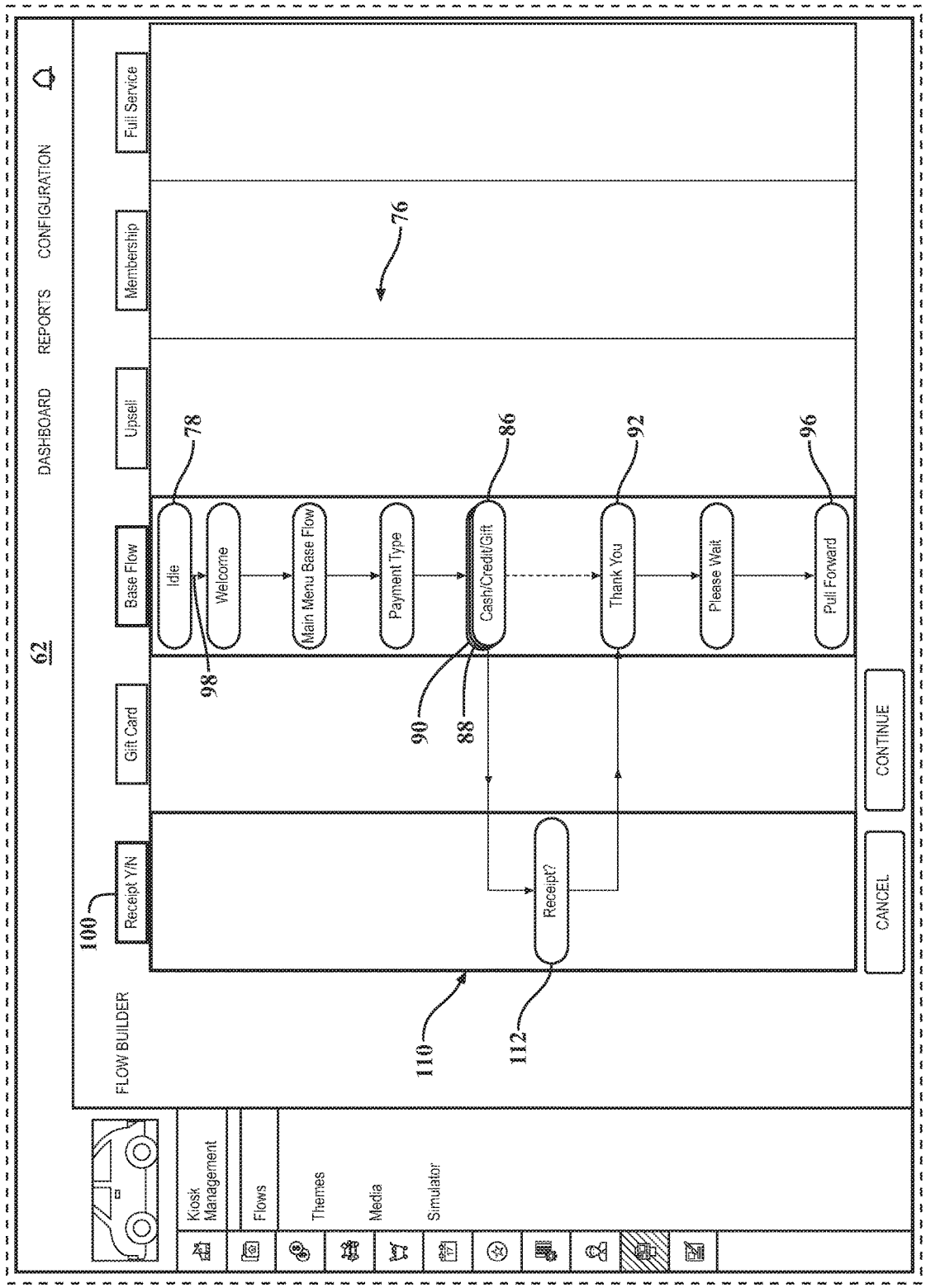
FIG. 7 is a second screen display generated by the exemplary system shown in FIGS. 1 and 2, presented to the operator of the car wash, wherein selection of a button has resulted in an alteration of what was displayed in FIG. 6 whereby the display further displays at least one sub-path that branches away from a first predetermined position along the primary path and rejoins the primary path at a second predetermined position along the primary path and at least one symbol is disposed along the at least one sub-path.

As shown in FIG. 7, in executing the workflow builder module 70, in response to selection of the button 100, the primary server computing device 12 can control the display 62 to display a sub-path 110. The exemplary sub-path 110 branches away from a first predetermined position along the primary path 98 and rejoins the primary path 98 at a second predetermined position along the primary path 98. In the exemplary embodiment, the exemplary first predetermined position is one of the symbols 86, 88, 90 and the exemplary second predetermined position is the symbol 92. In the exemplary embodiment, both the first predetermined position and the second predetermined position lie between the start symbol 78 and the end symbol 96 along the primary path 98. At least one symbol 112 is disposed along the sub-path 110 between the first predetermined position 86, 88, or 90 and the second predetermined position 92. The exemplary at least one symbol 112 is disposed along the at least one sub-path 110 and corresponds to at least one action not included in the first plurality of actions and also to a screen display associated with the at least one action that is not included in the first plurality of screen displays. In the exemplary embodiment of the present disclosure, the symbol 112 represents the action of the system 10 soliciting the customer's input regarding whether a receipt of payment is desired.

Figure 8:
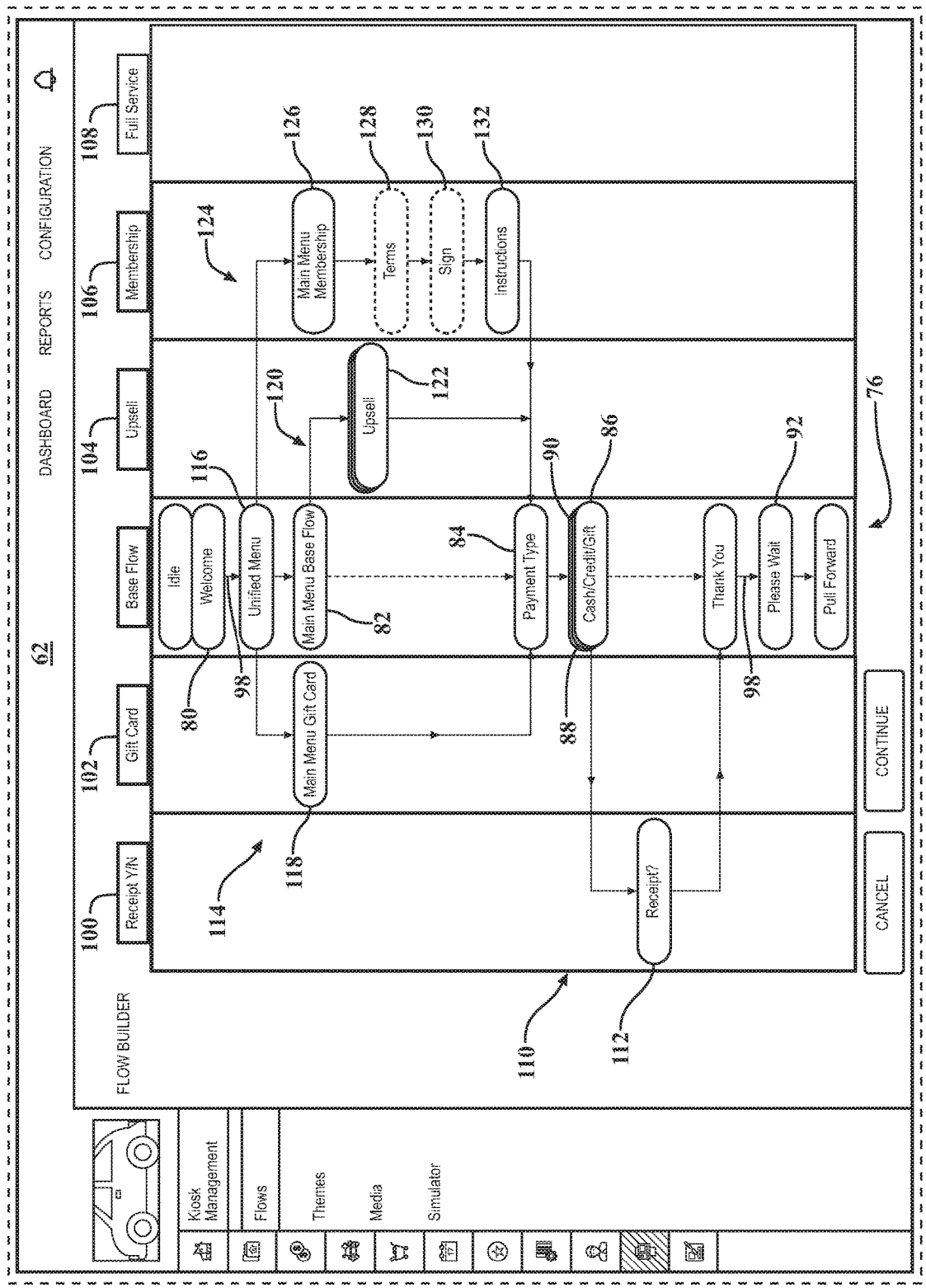
FIG. 8 is a third screen display generated by the exemplary system shown in FIGS. 1 and 2, presented to the operator of the car wash, wherein the selection of a plurality of buttons has resulted in an alteration of what was displayed in FIG. 6 whereby the display further displays a plurality of sub-paths that each branch away from different predetermined positions along the primary path and rejoin the primary path at a different predetermined positions along the primary path and wherein at least one symbol is disposed along each of the sub-paths.

Referring now to FIG. 8, the exemplary system 10 can, in executing the workflow builder module 70, in response to the selection of the buttons 100-106, can control the display 62 to display a plurality of sub-paths. Each sub-path can be displayed in response to selection of a particular one of the first plurality of buttons 100-108. Each of the plurality of sub-paths branches away from the same or different first predetermined positions along the primary path 98 and rejoins the primary path 98 at the same or different second predetermined positions along the primary path 98. At least one symbol can be disposed along each of plurality of sub-paths between the respective first predetermined position and the respective second predetermined position. Each of the respective at least one symbol disposed along each of the plurality of sub-paths corresponds to at least one screen display not included in the first plurality of screen displays.

The exemplary system 10 can, in executing the workflow builder module 70, in response to the selection of one or more of the first plurality of buttons 100-108, can control the display 62 to alter the display/appearance of the primary path 98 wherein at least one more symbol is added to the primary path 98. This allows the operator to add multiple sub-paths while protecting the base workflow. The exemplary system 10 reduces the likelihood that the operator will subsequently incorporate graphical information or text in a sub-path that is not consistent with screen displays associated with actions along the primary path 98. The arrangement clearly communicates to the operator of the car wash 18 how the tertiary computing device 16 will be perceived by the user of the car wash 18 and will reduce the likelihood of user confusion, which itself would cause downtime of the electromechanical devices of the car wash 18.

In response to selection of the button 102, the system 10 can control the display 62 to display an exemplary sub-path 114. The exemplary sub-path 114 branches away from a first predetermined position along the primary path 98 and rejoins the primary path 98 at a second predetermined position along the primary path 98. In the exemplary embodiment, the exemplary first predetermined position for the exemplary sub-path 114 is a symbol 116 added to the primary path 98. In the exemplary embodiment of the present disclosure, the symbol 116 represents the action of the system 10 soliciting the customer's input regarding whether more than a single, immediate wash is desired. In the exemplary embodiment, the exemplary second predetermined position for the exemplary sub-path 114 is the symbol 84. At least one symbol 118 is disposed along the at least one sub-path 114 between the first predetermined position 116 and the second predetermined position 84. The exemplary at least one symbol 118 is disposed along the at least one sub-path 114 and corresponds to at least one action not included in the first plurality of actions and also to a screen display associated with the at least one action that is not included in the first plurality of screen displays. In the exemplary embodiment of the present disclosure, the symbol 118 represents the action of the system 10 soliciting the customer's input regarding the number of washes to be included on a pre-paid card.

In response to selection of the button 104, the system 10 can control the display 62 to display an exemplary sub-path 120. The exemplary sub-path exemplary sub-path 120 branches away from a first predetermined position along the primary path 98 and rejoins the primary path 98 at a second predetermined position along the primary path 98. In the exemplary embodiment, the exemplary first predetermined position for the exemplary sub-path 120 is the symbol 82 and the exemplary second predetermined position for the exemplary sub-path 120 is the symbol 84. At least one symbol 122 is disposed along the at least one sub-path 120 between the first predetermined position 82 and the second predetermined position 84. The exemplary at least one symbol 122 is disposed along the at least one sub-path 120 and corresponds to at least one action not included in the first plurality of actions and to a screen display associated with the at least one action that is not included in the first plurality of screen displays. In the exemplary embodiment of the present disclosure, the symbol 122 represents the action of the system 10 providing the customer another opportunity to increase the number of electromechanical devices to be applied to the vehicle 30 in the tunnel 20.

In response to selection of the button 106, the system 10 can control the display 62 to display an exemplary sub-path 124. The exemplary sub-path exemplary sub-path 124 branches away from a first predetermined position along the primary path 98 and rejoins the primary path 98 at a second predetermined position along the primary path 98. In the exemplary embodiment, the exemplary first predetermined position for the exemplary sub-path 124 is the symbol 116 and the exemplary second predetermined position for the exemplary sub-path 124 is the symbol 84. A plurality of symbols 126, 128, 130, 132 are disposed along the at least one sub-path 124 between the first predetermined position 116 and the second predetermined position 84. The exemplary symbols 126-132 are disposed along the sub-path 124 and correspond to actions not included in the first plurality of actions and to screen displays associated with those actions. In the exemplary embodiment of the present disclosure, the symbols 126-132 represent actions of the system 10 soliciting the customer's input regarding establishing a membership in the car wash 18.

In response to selection of the button 108, the system 10 can control the display 62 to display all of the exemplary sub-paths 110, 114, 120, and 124.

At least one practical application provided by the system 10 is the simplification of customizing a workflow, while preventing the introduction of errors into the workflow. Errors in the workflow can result in downtime of the car wash 20 and diminished efficiency. The second display 62 can be controlled to display the sub-paths as parallel to the primary path 98, as shown in FIG. 8. This allows the operator to immediately apprehend how a sub-path will change the operational flow that is carried out at the tertiary computing device 16, relative to the primary path 98. By maintaining the display of the primary path 98 side-by-side to the sub-path, the exemplary system 10 reduces the likelihood that the operator will subsequently incorporate screens in the sub-path 100 that are not consistent with screens disposed along the primary path 98. Any such inconsistency would create consumer confusion and delay or suspend operations of the car wash 18. Thus, the system 10 is configured to operate such that the likelihood that human error will cause delays in the operation of the car wash 18 is reduced.

Further, the second display 62 can be controlled to alter the display of the primary path 98, in response to the display of the a sub-path, wherein spacing between the first plurality of symbols 78-96 is changed and one or more of the symbol(s) positioned along the sub-path are adjacent to a gap between two of the first plurality of symbols. This further allows the operator to immediately apprehend how the sub-path will change the operational flow that is carried out at the tertiary computing device 16, relative to the primary path 98. By shifting the spacing and positioning the action occurring along the sub-path adjacent to a gap, the workflow builder module 70 reduces the likelihood that the operator will incorporate graphical information or text in the sub-path that is not consistent with screens of the primary path 98.

Figure 9:
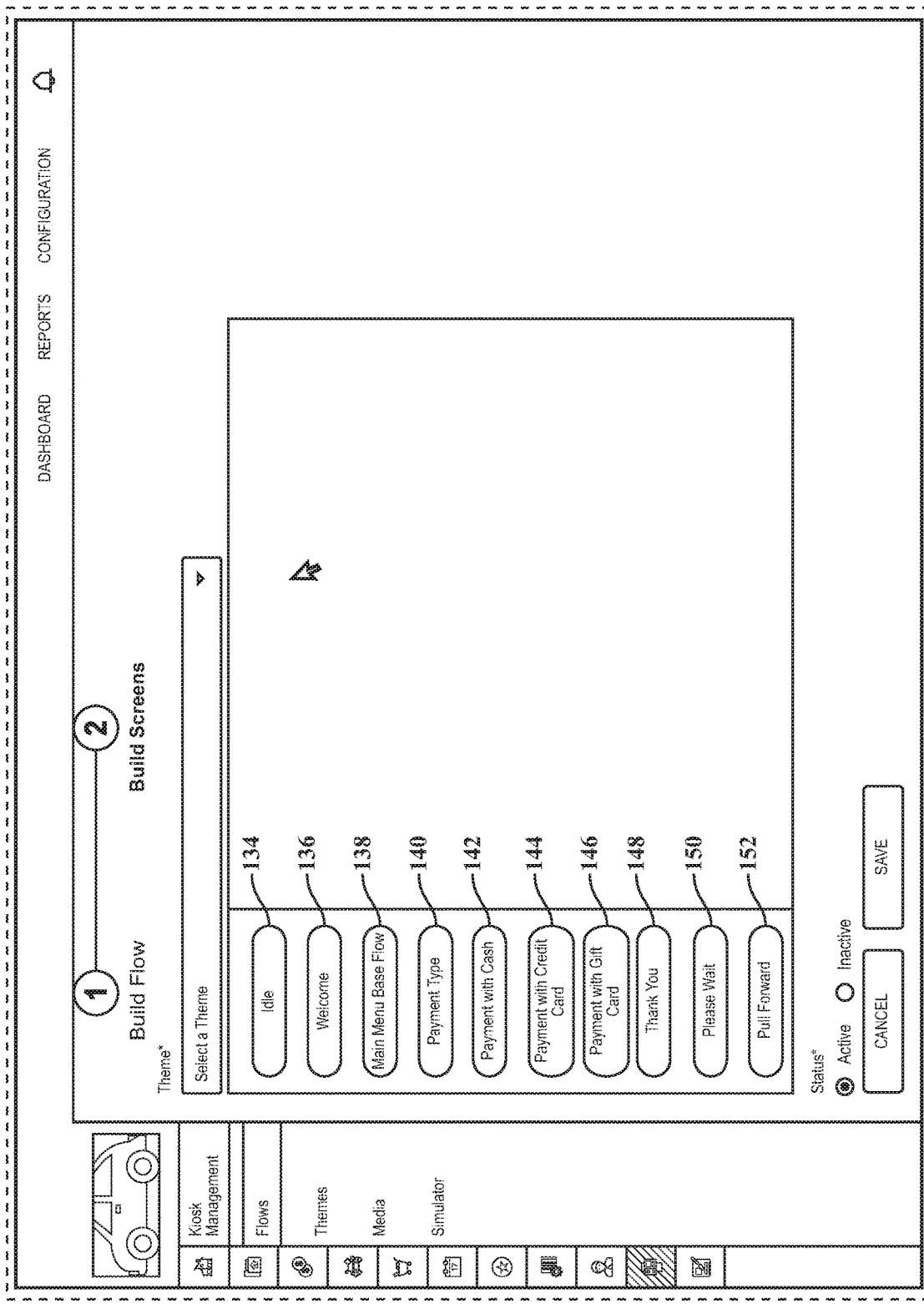
FIG. 9 is a fourth screen display generated by the exemplary system shown in FIGS. 1 and 2, presented to the operator of the car wash, wherein a display is controlled to display a second plurality of symbols in the form of a second plurality of buttons.

FIG. 9 represents an exemplary screen visible to the operator of the car wash 20 after the creation of a new workflow or the modification of an existing workflow. The screen displayed in FIG. 9 can be reached after selecting the continue button in FIG. 8. In the illustrated embodiment, the operator has chosen the base workflow without any sub-paths. As illustrated in FIG. 9, the system 10, in executing the workflow builder module 70, can control the second display 62 to display the first plurality of actions as a second plurality of symbols in the form of a second plurality of buttons 134, 136, 138, 140, 142, 144, 146, 148, 150, 152. It is noted that the designation "symbol" was applied in FIG. 6 instead of "button" because in FIG. 9 each action is selectable and the selection results in the display of further options, as will be detailed below. Conversely, in FIG. 6, each symbol is not selectable in the exemplary embodiment of the present disclosure. The symbols of FIG. 6 and buttons of FIG. 9 correspond as follows: 78-134, 80-136, 82-138, 84-140, 86-142, 88-144, 90-146, 92-148, 94-150, and 96-152. It is noted that, in various embodiments of the present disclosure, the first plurality of symbols and the second plurality of buttons can be the same shape or different shapes, the same color or different colors, and the symbols of either or both the first and second pluralities of symbols can all be the same or can all be different.

Figure 10:
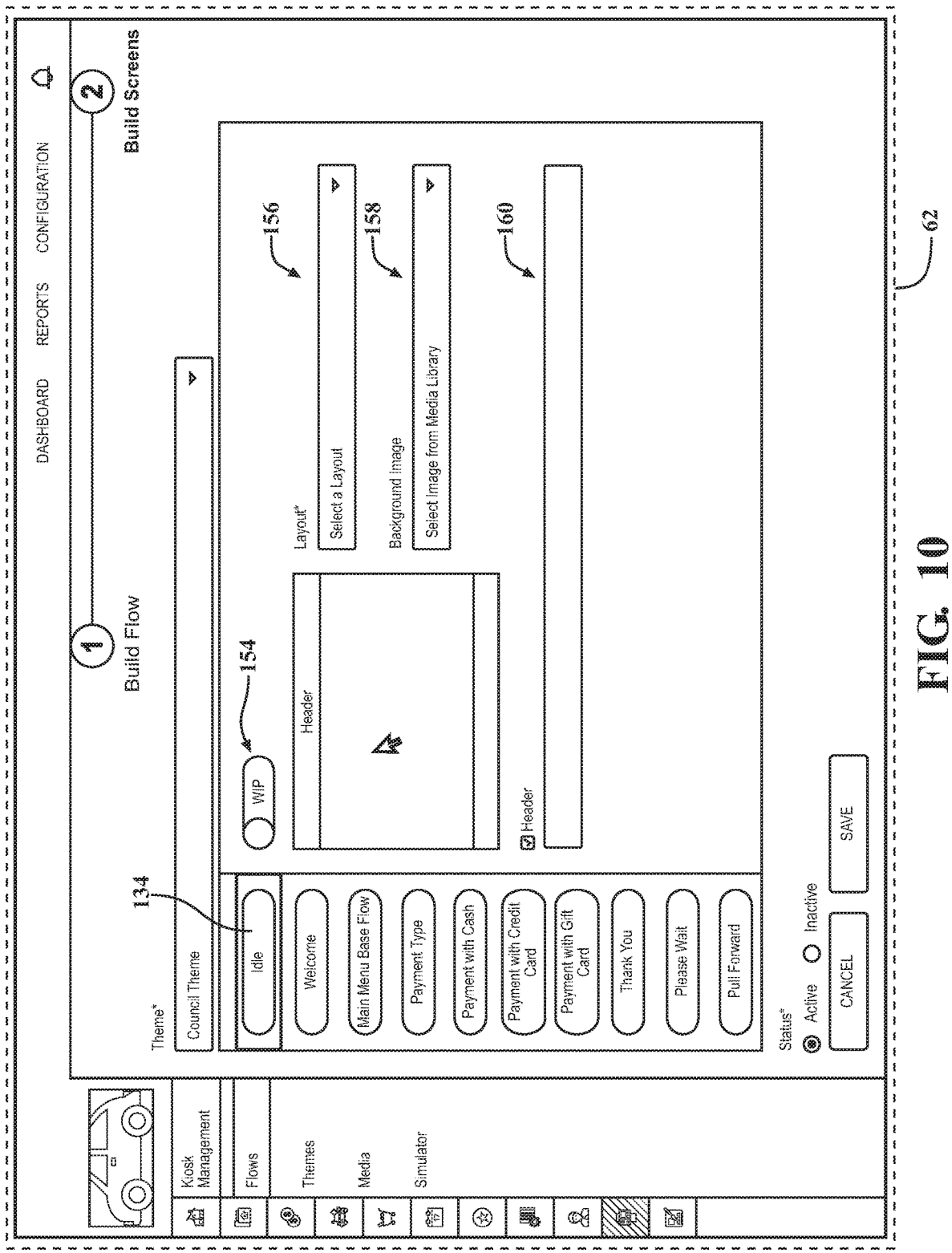
FIG. 10 is a fifth screen display generated by the exemplary system shown in FIGS. 1 and 2, presented to the operator of the car wash, wherein selection of a button of the second plurality of buttons has resulted in an alteration of what was displayed in FIG. 9 whereby the display displays a second plurality of graphical elements configured for changing a respective screen display.

Referring now to FIG. 10, the primary server computing device 12 can control the second display 62 to display a second plurality of graphical elements configured for changing a respective screen display, in response to a selection by the user of the corresponding button. For example, the screen displayed in FIG. 10 can be reached after selecting the button 134 in FIG. 9. In response to the selection of button 134 by the operator of the car wash 18, a second plurality of graphical elements are displayed, including a completion indicator slider 154, pull-down menus 156 and 158, and a text-entry field 160. Each of the displayed second plurality of graphical elements are configured for changing the screen display displayed to the user of the car wash 18 through the tertiary computing device 16. At this stage of modification, the system 10 again controls the user interface to limit how an operator can make changes so that the base workflow is not disrupted/damaged.

Figure 11:
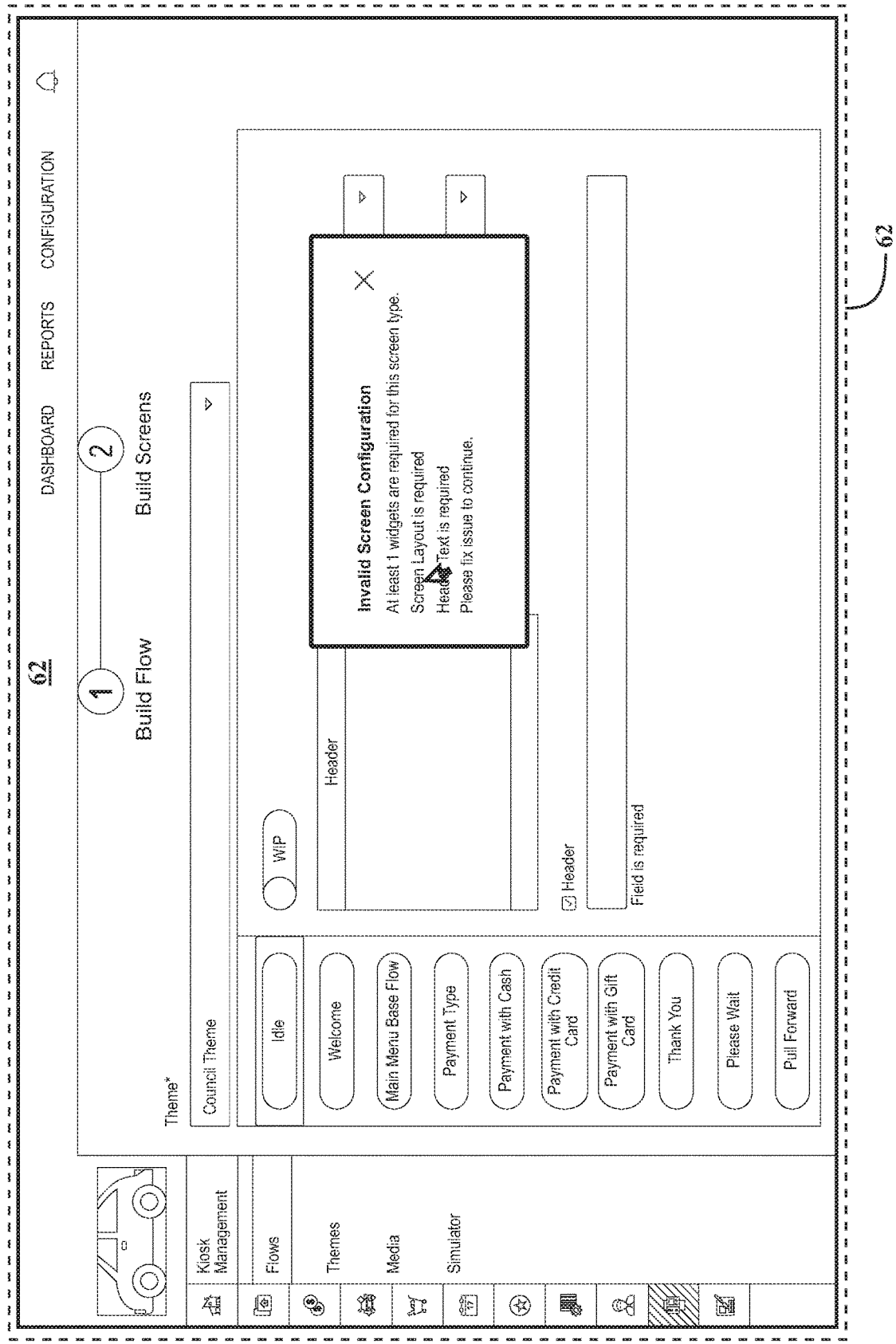
FIG. 11 is a sixth screen display generated by the exemplary system shown in FIGS. 1 and 2, presented to the operator of the car wash, demonstrating that the exemplary system confirms that one or more changeable attributes of the respective screen display have been selected by the operator of the car wash by using the second plurality of symbols before the respective screen display is displayed on a tertiary computing device.
Figure 15:
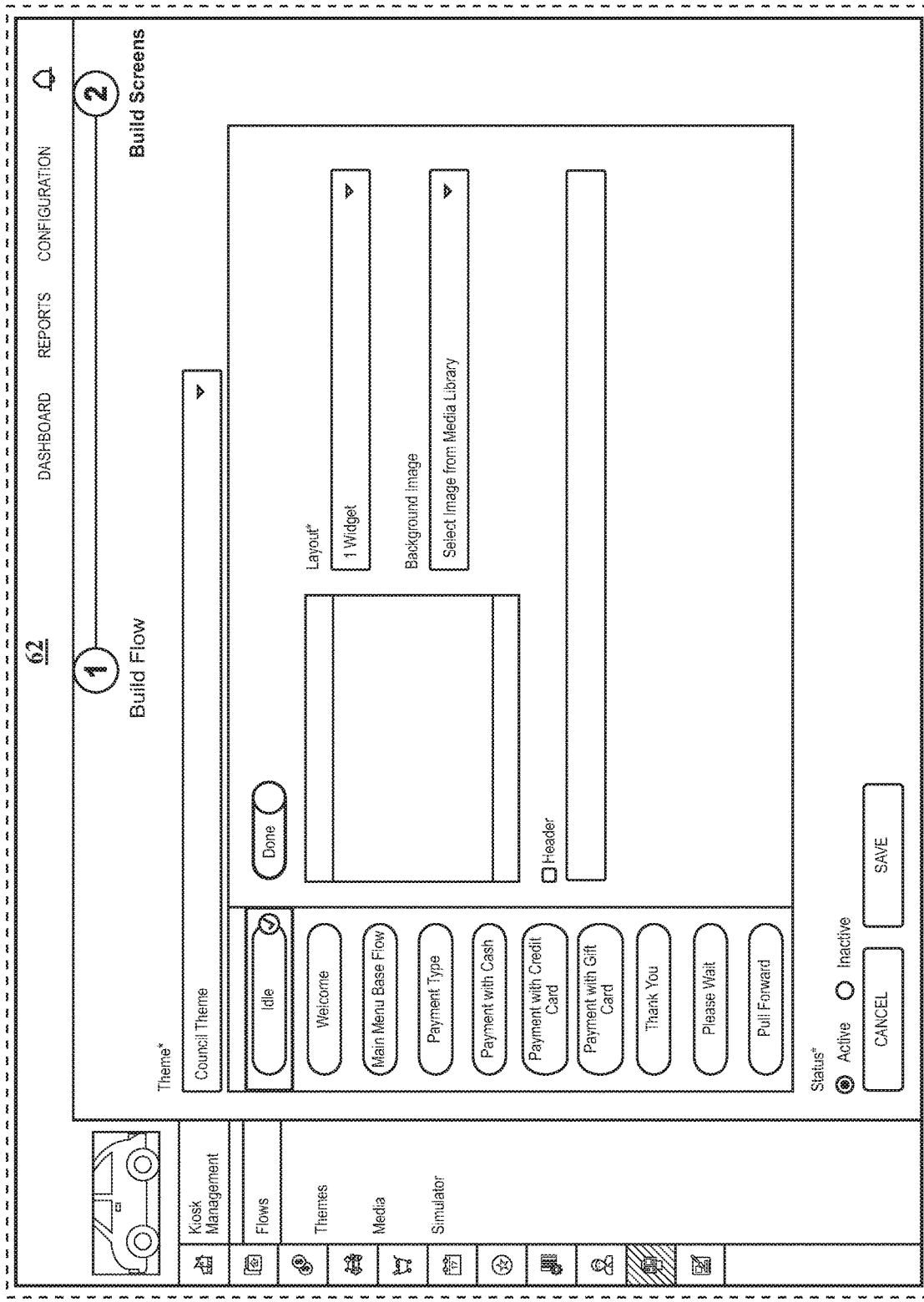
FIG. 15 is a tenth screen display generated by the exemplary system shown in FIGS. 1 and 2, presented to the operator of the car wash, when options for the one or more changeable attributes of the respective screen display have been selected by the operator of the car wash.

The screen display illustrated in FIG. 11 can be reached after attempting to slide the completion indicator slider 154 to the right in FIG. 9, to indicate that modifications are complete. Since selections had not been made for pull-down menus 156 and 158 nor had text been entered in the text-entry field 160, the system 10 controls the display 62 to advise the operator that the screen display associated with the action 78 is not complete. FIG. 15 shows the appearance of the completion indicator slider 154 after having been slid to the right, after selections had been made for pull-down menus 156 and 158 and for the text-entry field 160. Thus, the system 10 confirms that the one or more changeable attributes of a particular screen display have been selected by the operator using the second plurality of symbols, before displaying the respective screen on the at least one tertiary computing device 16.

Figure 12:
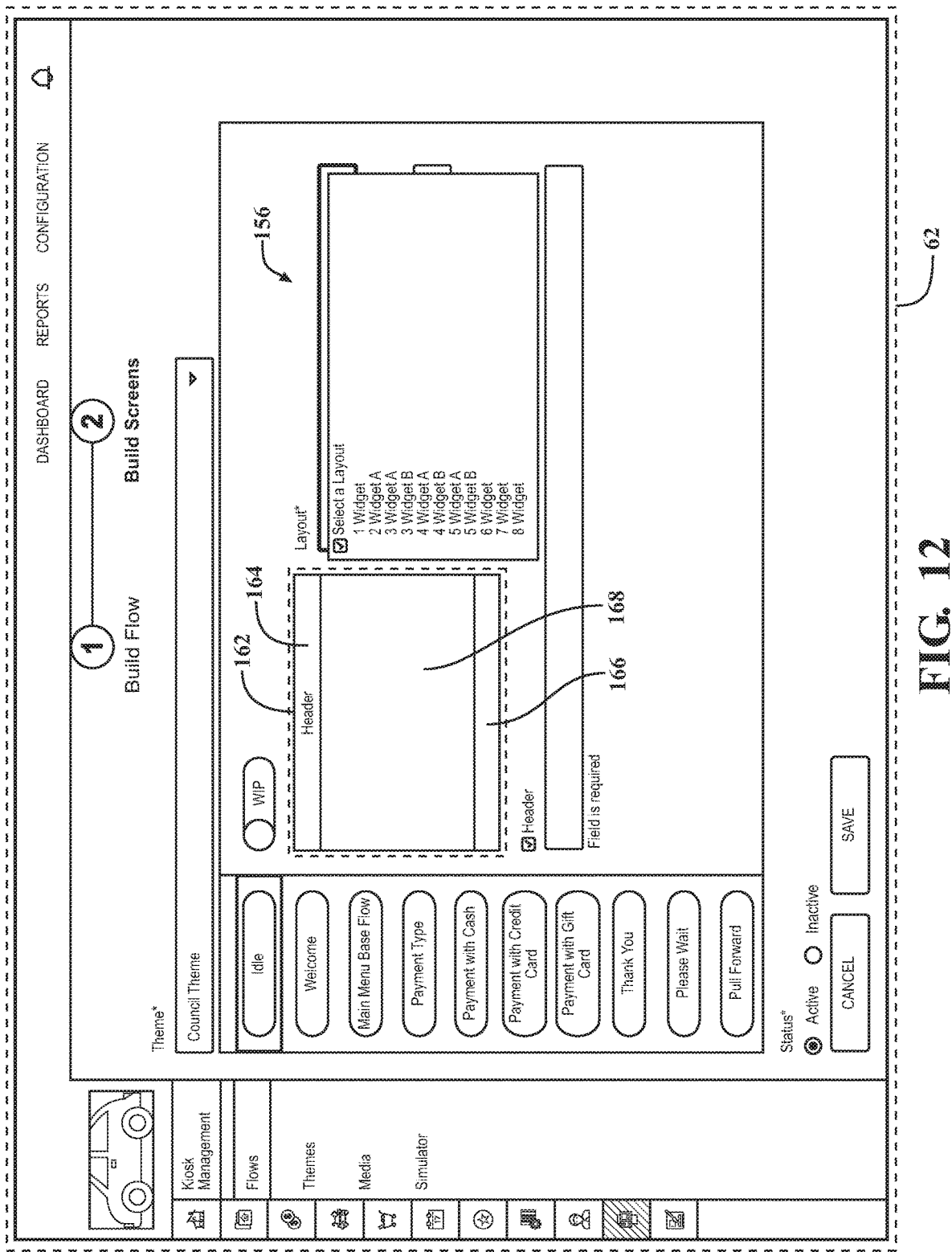
FIG. 12 is a seventh screen display generated by the exemplary system shown in FIGS. 1 and 2, presented to the operator of the car wash, when the operator of the car wash is selecting a layout of the respective screen display.

The screen display illustrated in FIG. 12 can be reached by selecting the pull-down menu 156 in FIG. 10. The pull-down menu 156 is an exemplary first graphical element configured to select a layout of the respective screen display. The layout defines how at least one portion of the screen display will be arranged. For example, in the exemplary embodiment, the area surrounded by the box 162 corresponds to the screen display that will be visible to the user at the tertiary computing device 16. The screen display includes a header portion 164, a footer portion 166, and a main field portion 168. The operator can choose how the main field portion 168 will be utilized through the pull-down menu 156. In the exemplary menu, the operator can choose from a plurality of different widgets and a plurality of different numbers of widgets. As used herein, "widget" refers to portion of the main field 168 allocated for a particular purpose.

Figure 13:
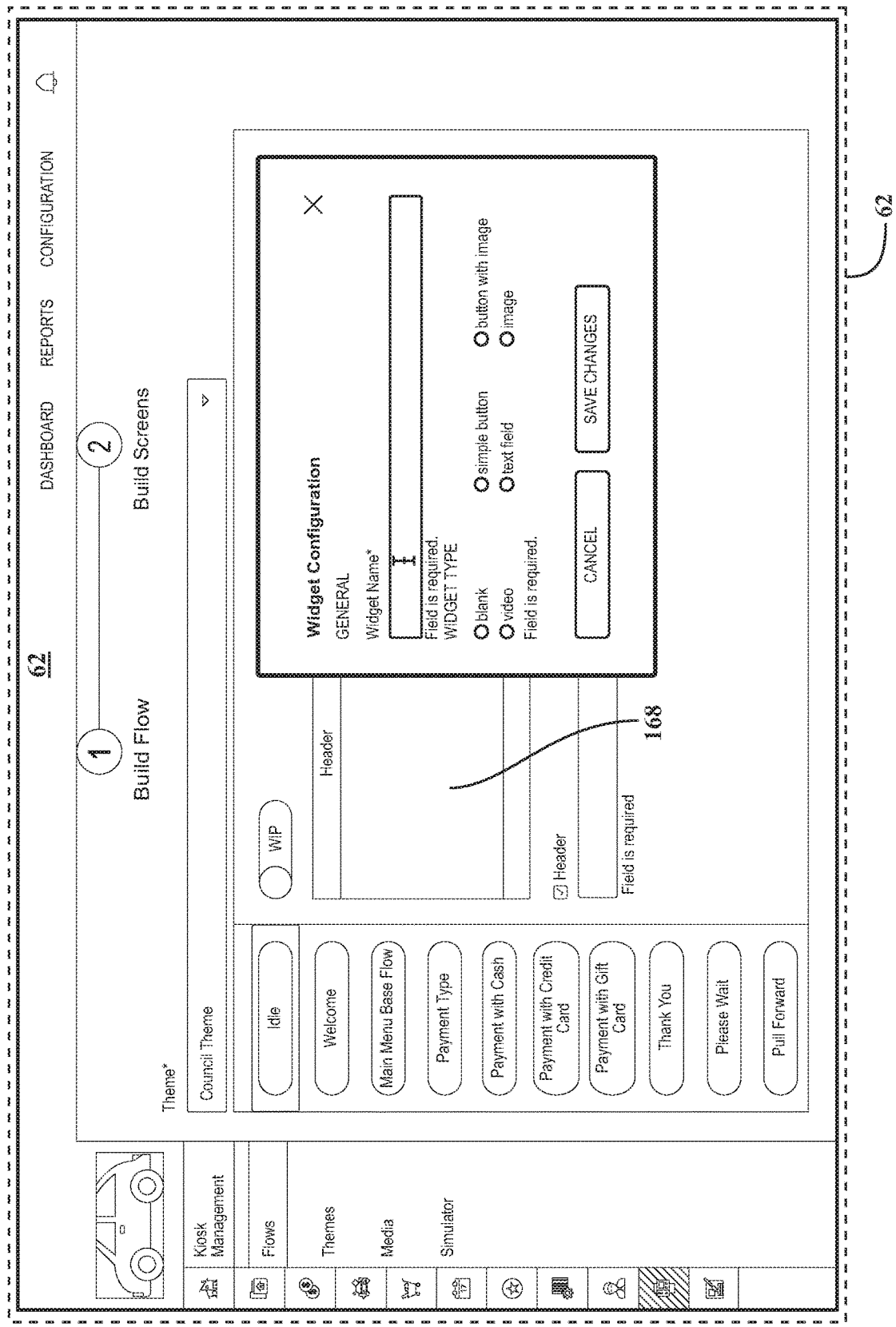
FIG. 13 is a eighth screen display generated by the exemplary system shown in FIGS. 1 and 2, presented to the operator of the car wash, wherein a display controlled by the exemplary system is controlled to display a menu of options for selecting a content of at least one portion of the respective screen display.

The screen display illustrated in FIG. 13 can be reached by selecting "1 Widget" in the pull-down menu 156 in FIG. 12. The main field portion 168 will contain one widget. FIG. 13 shows that the operator is able to name the widget and select the operation of the widget. The "blank" operation will result in the main field portion 168 only displaying the wallpaper (defined by the theme). The "video" operation will result in the main field portion 168 displaying a video that can be uploaded by the operator. The "image" operation will result in the main field portion 168 displaying an image that can be uploaded by the operator. It is noted that the image uploaded by the operator can replace one of the first plurality of graphical elements or can be uploaded for inclusion in the first plurality of graphical elements. The "text field" operation will result in the main field portion 168 displaying a text field that can fetch text saved in the memory of the primary server computing device 12 or the memory of the secondary server computing device 14.

Figure 14:
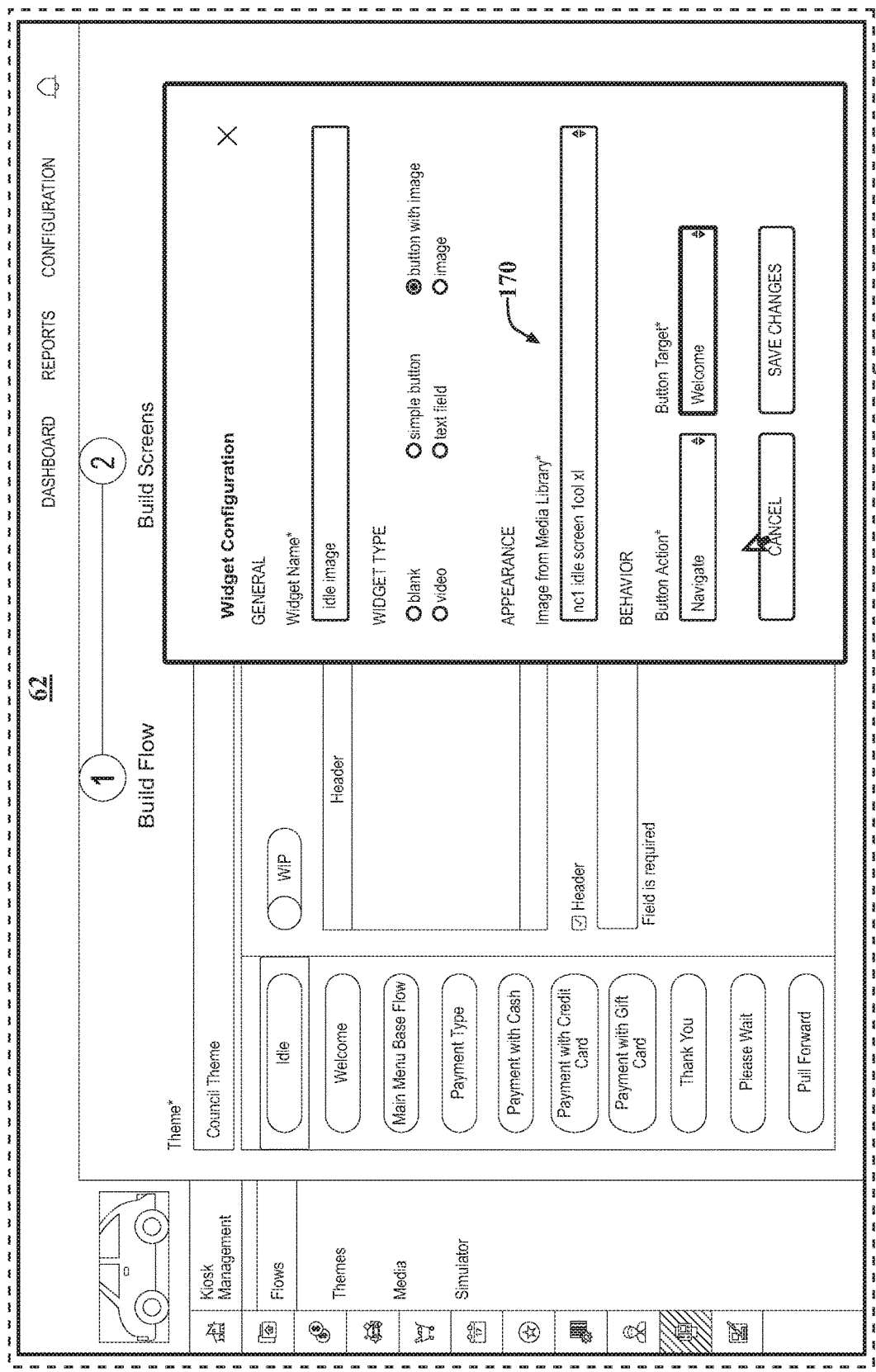
FIG. 14 is a ninth screen display generated by the exemplary system shown in FIGS. 1 and 2, presented to the operator of the car wash, when the operator of the car wash has selected an option shown in FIG. 13.

FIG. 14 shows the screen display when the operator selects the "button with image" operation. The primary server computing device 12 can control the second display 62 to display a field 170 to upload an image. The primary server computing device 12 can also control the second display 62 to display an action that will occur when a button is pressed and also a target of the action. As set forth above, FIG. 15 shows the appearance of the second display 62 after the content of a screen display for the idle action 78 has been finalized.

Figure 16:
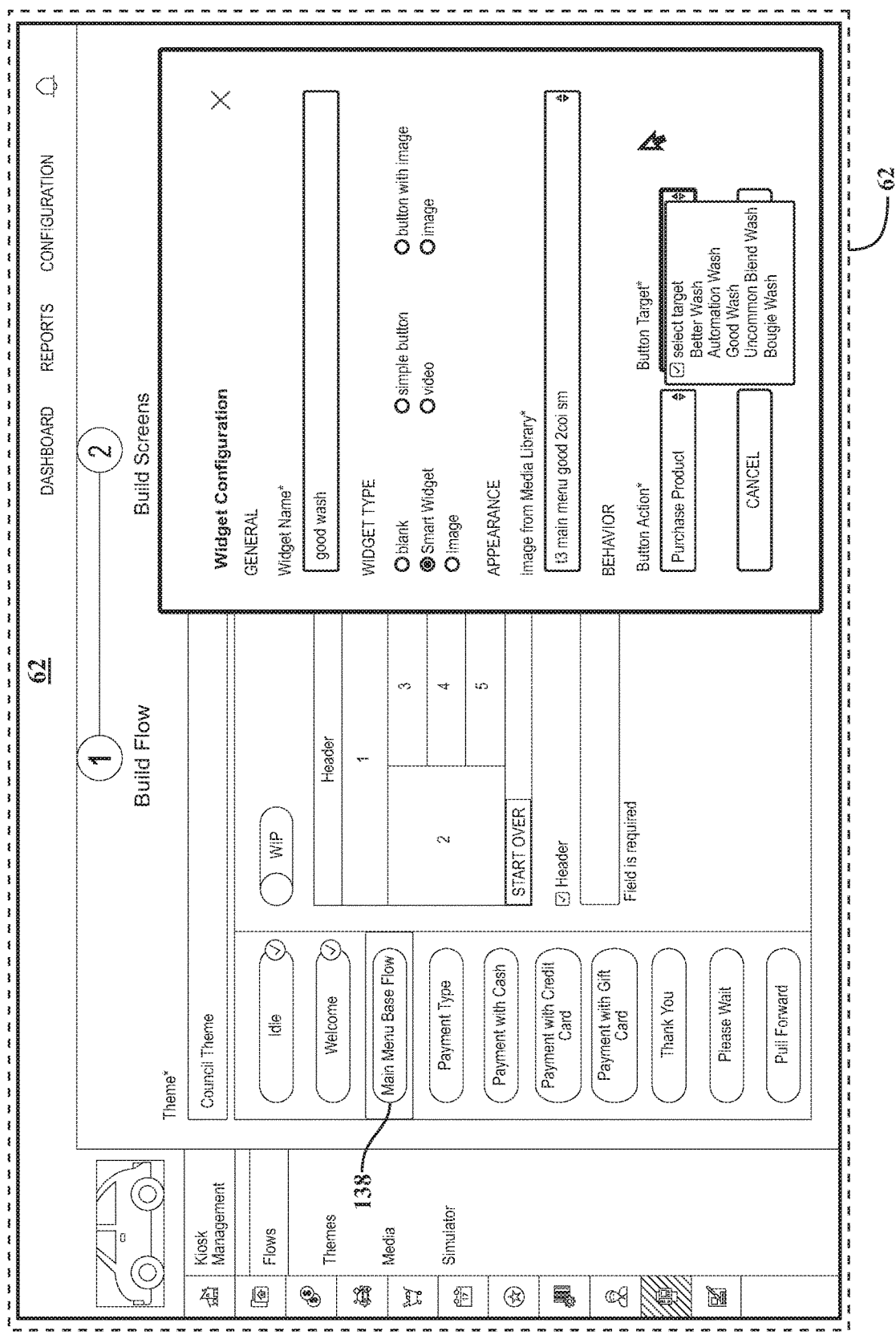
FIG. 16 is an eleventh screen display generated by the exemplary system shown in FIGS. 1 and 2, presented to the operator of the car wash, wherein a display controlled by the exemplary system is controlled to display a menu of options for selecting a content of at least one portion of the respective screen display and, relative to FIG. 13, shows that the exemplary system can permit different options for different respective screen displays.

FIG. 16 shows the screen displayed by the secondary display 62, when controlled by the primary server computing device 12, after the button 138 is selected by the operator. The button 138 corresponds to the action/symbol 82. The screen display shown in FIG. 16 demonstrates that the system 10 determines what options are displayed in the menu in response to the first predetermined order. The options for modification that are presented to the user are not the same for each screen display. Specifically, a "smart widget" option is included for the screen display corresponding to the main menu base flow action but was not presented for the idle action. The operator of the system 10 can thus limit the actions of the operator of the car wash 20 to prevent actions that could cause downtime at the car wash 18.

Figure 17:
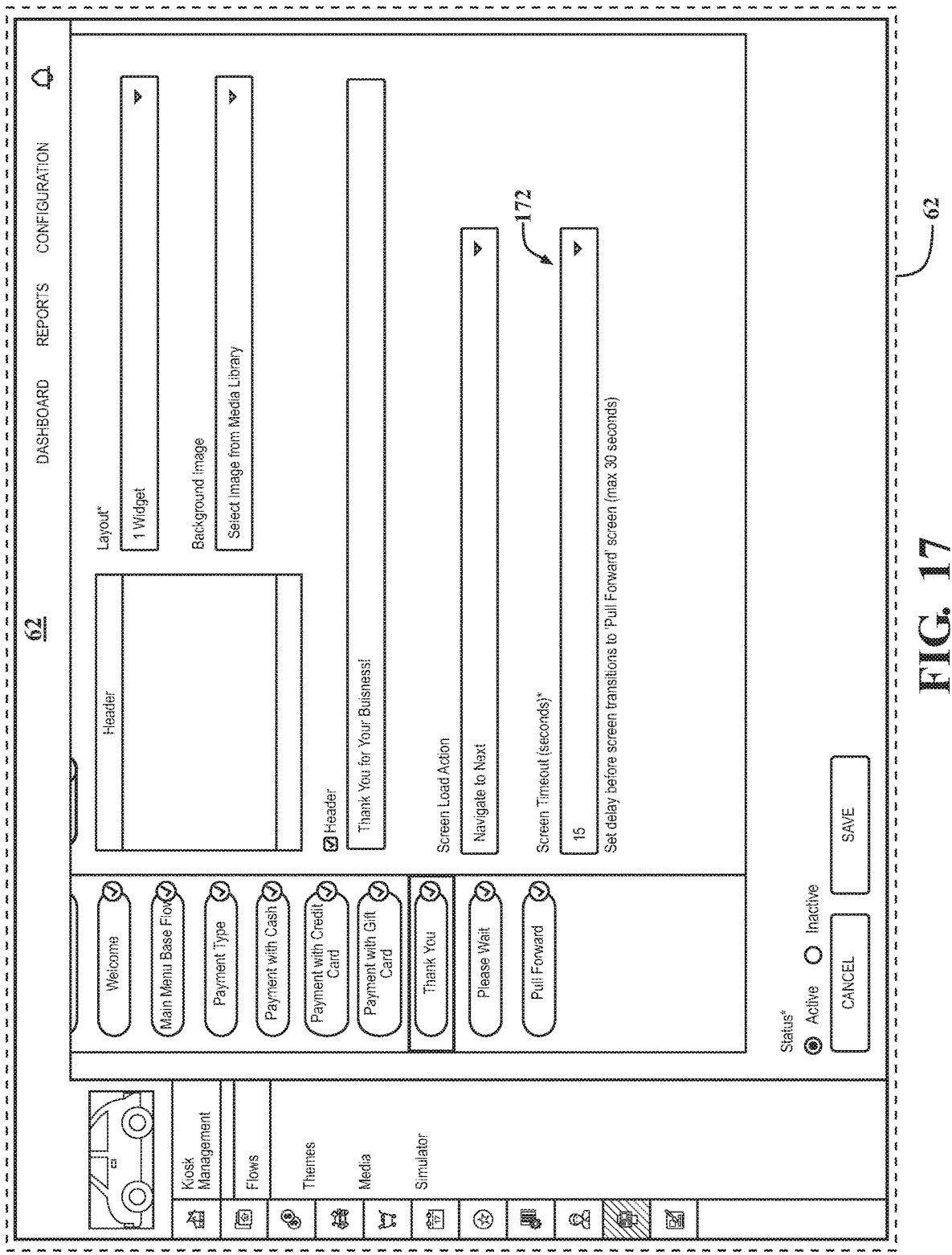
FIG. 17 is a twelfth screen display generated by the exemplary system shown in FIGS. 1 and 2, presented to the operator of the car wash, wherein a time period of display of a respective screen display can be selected by the operator of the car wash.

FIG. 17 shows the screen display of the secondary display 62, controlled by the primary server computing device 12, when the operator of the car wash 18 is modifying the action 92, which corresponds to the button 148. In text entry field 172, the operator can select the period of time in which the screen display corresponding to action 92 is displayed. The screen display shown in FIG. 17 also shows all of the buttons 134-152 have been selected and the corresponding screen displays have been completed. After the new workflow is created or an existing workflow is modified, the system 10 can display, with the display 54 of the at least one tertiary computing device 16, all of the screen displays including any screen display that is included in the modified workflow.

In another aspect of the present disclosure, at least some of the text displayed in screen displays can be made through the SiteManager user interface without using the workflow builder module 70. The price of various wash options can be retrieved from memory and overlaid on widgets or wallpaper chosen using the workflow builder module 70. Such price changes can be made using the computing device 58 and a price change is then replicated down to the secondary server computing device 14. Screen displays displayed at the tertiary computing device 16 every time that the tertiary computing device 16 refreshes the pages of the workflow. The amount to be charged to the customer is sent by the secondary server computing device 14 to the POS device, and then payment is handled as described above. So, in effect, the same application that provides the price change to the workflow UI applies the price change to the POS when a customer chooses to purchase the item. Products, plans, and specials are also changeable by the operator using the SiteManager application.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. Aspects of the present disclosure are applicable beyond car washes, such as operating environments which involve a user engaging a kiosk to place an order for services carried out by one or more electromechanical devices. More than one "invention" may be disclosed in the present disclosure; an "invention" is defined by the content of a patent claim and not by the content of a detailed description of an embodiment of an invention.

What is claimed is:

1. A method of controlling operations of a car wash comprising:
    positioning at least one tertiary computing device having one or more processors and a touch screen display along a pathway extending through a tunnel of the car wash;
    storing, in memory of at least one secondary server computing device having one or more processors, a workflow executed on the at least one tertiary computing device and including data defining at least a first plurality of actions, a screen display associated with each of the first plurality of actions, a first plurality of graphical elements displayed in one or more of the screen displays associated with the first plurality of actions, and a first predetermined order of displaying the screen displays associated with the first plurality of actions;
    fetching, from the at least one secondary server computing device, with the at least one tertiary computing device, the screen displays associated with the first plurality of actions;
    positioning the at least one secondary server computing device on-site at the car wash with the at least one tertiary computing device;
    displaying, with the touch screen display of the at least one tertiary computing device, successively according to the first predetermined order, each screen display of the screen displays associated with the first plurality of actions;
    receiving, with the touch screen display of the at least one tertiary computing device, one or more customer inputs during said displaying;
    communicating, from the at least one tertiary computing device to the at least one secondary server computing device, the one or more customer inputs received during said displaying;
    directing a command, from the at least one secondary server computing device to at least one electromechanical device within the tunnel of the car wash, in response to the one or more customer inputs received during said communicating;
    storing the workflow in a memory of a primary server computing device having one or more processors, off-site of the car wash, in addition to said storing in the memory of the at least one secondary server computing device;
    controlling, with at least one of the primary server computing device and the at least one secondary server computing device, a first portion of the data of the workflow from an alteration through the at least one secondary server computing device, wherein the first portion of the data of the workflow includes the first plurality of actions and the first predetermined order;
    executing, on at least one of the primary server computing device and the at least one secondary server computing device, a workflow builder module to alter a second portion of the data of the workflow;
    said executing also including controlling a second display, with the at least one secondary server computing device, to concurrently display:
        the first portion of the data of the workflow as a flow diagram including a first plurality of symbols including a start symbol and an end symbol, the first plurality of symbols disposed along a primary path between the start symbol and the end symbol, wherein each symbol of the first plurality of symbols corresponds to at least one of the first plurality of actions and to the respective screen display, the first plurality symbols arranged along the primary path according to the first predetermined order, and
        the second portion of the data of the workflow including a first plurality of buttons, each selectable by a user of the workflow builder module, and at least one sub-path, displayed in response to selection of one of the first plurality of buttons, that branches away from a first predetermined position along the primary path and rejoins the primary path at a second predetermined position along the primary path, wherein both the first predetermined position and the second predetermined position lie between the start symbol and the end symbol along the primary path, wherein at least one symbol is disposed along the at least one sub-path between the first predetermined position and the second predetermined position, wherein the at least one symbol disposed along the at least one sub-path corresponds to at least one action not included in the first plurality of actions and to a screen display associated with the at least one action and not included in the first plurality of screen displays; and
    displaying, with the display of the at least one tertiary computing device, the screen display not included in the first plurality of screen displays in addition to at least most of the screen displays associated with the first plurality of actions after said controlling the second display.

2. The method of claim 1 wherein said controlling the second display is further defined as:
    controlling, with the at least one secondary server computing device, the second display to display a portion of the at least one sub-path along which the at least one symbol is disposed as parallel to the primary path.

3. The method of claim 2 wherein said controlling the second display is further defined as controlling the second display to:
    alter the display of the primary path, in response to the display of the at least one sub-path, wherein spacing between the first plurality of symbols is changed; and position the at least one symbol along the portion of the at least one sub-path adjacent to a gap between two of the first plurality of symbols.

4. The method of claim 1 wherein said controlling the second display is further defined as:

controlling, with the at least one secondary server computing device, the second display to alter the display of the primary path, in response to the display of the at least one sub-path, wherein at least one more symbol is added to the primary path.

5. The method of claim 4 wherein the at least one more symbol added to the primary path is further defined as the first predetermined position.

6. The method of claim 5 wherein the at least one sub-path is further defined as a plurality of sub-paths, each displayed in response to selection of a particular one of the first plurality of buttons, each of the plurality of sub-paths branches away from the first predetermined position along the primary path and rejoins the primary path at the second predetermined position along the primary path, wherein both the first predetermined position and the second predetermined position lie between the start symbol and the end symbol along the primary path, wherein at least one symbol is disposed along each of plurality of sub-paths between the first predetermined position and the second predetermined position, wherein the respective at least one symbol disposed along each of the plurality of sub-paths corresponds to at least one screen display not included in the first plurality of screen displays.

7. The method of claim 6 wherein said controlling the second display is further defined as:

controlling, with the at least one secondary server computing device, the second display to display respective portions of each of the plurality of sub-paths along which the respective at least one symbols are disposed as parallel to the primary path.

8. The method of claim 1 wherein the at least one sub-path is further defined as a plurality of sub-paths, each displayed in response to selection of a particular one of the first plurality of buttons, including:

a first sub-path that branches away from the first predetermined position along the primary path and rejoins the primary path at the second predetermined position along the primary path, wherein both the first predetermined position and the second predetermined position lie between the start symbol and the end symbol along the primary path, wherein the at least one symbol is disposed along the first sub-path between the first predetermined position and the second predetermined position, wherein the at least one symbol disposed along the first sub-path corresponds to at least one screen display not included in the first plurality of screen displays; and a second sub-path that branches away from a third predetermined position along the primary path and rejoins the primary path at a fourth predetermined position along the primary path, wherein both the third predetermined position and the fourth predetermined position lie between the start symbol and the end symbol along the primary path, wherein both the third predetermined position and the fourth predetermined position are different from one another and different from both of the first predetermined position and the second predetermined position, wherein the at least one symbol is disposed along the second sub-path between the third predetermined position and the fourth predetermined position, wherein the at least one symbol disposed along the second sub-path corresponds to at least one screen display not included in the first plurality of screen displays.

9. The method of claim 1 wherein said executing the workflow builder module further includes:

uploading, at the at least one secondary server computing device, at least one image to replace an image included in the first plurality of graphical elements.

10. The method of claim 1 wherein said executing the workflow builder module further includes:

uploading, at the at least one secondary server computing device, at least one image for inclusion in the first plurality of graphical elements after said storing in the memory of the at least one secondary server computing device.

11. The method of claim 1 wherein said executing the workflow builder module, after said controlling the second display to concurrently display the first portion of the data of the workflow as a flow diagram and the second portion of the data of the workflow including the first plurality of buttons, further includes:

controlling, with the at least one secondary server computing device, the second display to display the first plurality of actions as a second plurality of symbols in the form of a second plurality of buttons, each of the second plurality of buttons selectable by the user, wherein each symbol of the second plurality of symbols corresponds to at least one of the first plurality of actions and to the respective screen display, wherein the second display is further controlled to display a second plurality of graphical elements configured for changing a respective screen display in response to a selection by the user of the corresponding one of the second plurality of symbols.

12. The method of claim 11 wherein the second plurality of graphical elements include a first graphical element to select a layout of the respective screen display, wherein the layout defines at least one portion of the respective screen display for display of a request for input.

13. The method of claim 12 wherein the first graphical element is a pull-down menu.

14. The method of claim 12 wherein said executing the workflow builder module, after said controlling, with the at least one secondary server computing device, the second display to display the second plurality of graphical elements, further includes:

controlling, with the at least one secondary server computing device, the second display to display a menu of options for a content of the at least one portion of the respective screen display in response to selection of the first graphical element by the user.

15. The method of claim 14 further comprising:

determining, with the primary server computing device, the options displayed in the menu in response to the first predetermined order.

16. The method of claim 15 further comprising:

confirming, with one of the primary server computing device and the at least one secondary server computing device, one or more changeable attributes of the respective screen display have been selected by the user using the second plurality of symbols before displaying the respective screen display on the at least one tertiary computing device.

17. The method of claim 16 wherein said fetching is further defined as:

accessing, with the at least one tertiary computing device, each screen display of the screen displays associated with the first plurality of actions with a web browser application.

18. A system for controlling operations of a car wash comprising:

a primary server computing device, having a first memory and one or more processors, configured to communicate with a plurality of remote computing devices, and off-site from the car wash, wherein a workflow is stored in said first memory, said workflow including data defining (i) at least a first plurality of actions, (ii) a screen display associated with each of said first plurality of actions, (iii) a first plurality of graphical elements displayed in one or more of said screen displays associated with said first plurality of actions, and (iv) a first predetermined order of displaying said screen displays associated with said first plurality of actions, at least one secondary server computing device, having a second memory and one or more processors, positioned on-site at the car wash, wherein said workflow is also stored in said second memory, wherein said at least one secondary server computing device and said primary server computing device are configured to communicate with one another, said at least one secondary server computing device configured to direct a command to at least one electromechanical peripheral positioned within the tunnel of the car wash;

wherein at least one of said primary server computing device and said at least one secondary server computing device controls a first portion of said data of said workflow from alteration through said at least one secondary server computing device, wherein said first portion of said data of said workflow includes said first plurality of actions and said first predetermined order;

wherein said at least one secondary server computing device includes a workflow builder module to alter a second portion of said data of said workflow;

at least one tertiary computing device having one or more processors and including a touch screen display, positioned along a pathway extending through a tunnel of the car wash, wherein said at least one tertiary computing device is configured to fetch from said at least one secondary server computing device said screen displays associated with said first plurality of actions, wherein said at least one tertiary computing device is further configured to display with said touch screen display each screen display of said screen displays associated with said first plurality of actions successively according to said first predetermined order, wherein said at least one tertiary computing device is further configured to receive one or more customer inputs with said touch screen display, and wherein said at least one tertiary computing device is further configured to communicate the one or more customer inputs received with said touch screen display to said at least one secondary server computing device;

wherein said at least one secondary server computing device is further configured to, in executing said workflow builder module, to control a second display to concurrently display:

the first portion of the data of the workflow as a flow diagram including a first plurality of symbols including a start symbol and an end symbol, said first plurality of symbols disposed along a primary path between the start symbol and the end symbol, wherein each symbol of the first plurality of symbols corresponds to at least one of the first plurality of actions and to the respective screen display, the first plurality symbols arranged along the primary path according to the first predetermined order, and the second portion of the data of the workflow including a first plurality of buttons, each selectable by a user of the workflow builder module, and at least one sub-path, displayed in response to selection of one of the first plurality of buttons, that branches away from a first predetermined position along the primary path and rejoins the primary path at a second predetermined position along the primary path, wherein both the first predetermined position and the second predetermined position lie between the start symbol and the end symbol along the primary path, wherein at least one symbol is disposed along the at least one sub-path between the first predetermined position and the second predetermined position, wherein the at least one symbol disposed along the at least one sub-path corresponds to at least one action not included in the first plurality of actions and to a screen display associated with the at least one action and not included in the first plurality of screen displays; and wherein said touch screen display of said at least one tertiary computing device is further configured to display the screen display not included in the first plurality of screen displays in addition to at least most of the screen displays associated with the first plurality of actions.

19. The system of claim 18 wherein said at least one tertiary computing device is further defined as a kiosk fixed closer to an entrance of the tunnel than to an exit of the tunnel.

20. The system of claim 18 wherein said at least one tertiary computing device is further defined as a tablet moveable relative to an entrance of the tunnel and an exit of the tunnel.

* * * * *